US012609732B2

(12) United States Patent
Sahraei et al.

(10) Patent No.: US 12,609,732 B2
(45) Date of Patent: Apr. 21, 2026

(54) PASSIVE COMMUNICATION VIA MULTIPLE REFLECTIVE SURFACES

(71) Applicant: QUALCOMM Incorporated, San Diego, CA (US)

(72) Inventors: Saeid Sahraei, San Diego, CA (US); Ahmed Elshafie, San Diego, CA (US); Hung Dinh Ly, San Diego, CA (US); Yu Zhang, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/559,979

(22) PCT Filed: Jul. 12, 2021

(86) PCT No.: PCT/CN2021/105729
§ 371 (c)(1),
(2) Date: Nov. 9, 2023

(87) PCT Pub. No.: WO2023/283759
PCT Pub. Date: Jan. 19, 2023

(65) Prior Publication Data
US 2024/0243780 A1     Jul. 18, 2024

(51) Int. Cl.
*H04B 7/04*        (2017.01)
*H04B 7/06*        (2006.01)

(52) U.S. Cl.
CPC ....... *H04B 7/04013* (2023.05); *H04B 7/0626* (2013.01)

(58) Field of Classification Search
CPC .. H04B 7/022; H04B 7/04013; H04B 7/0617; H04B 7/0626
See application file for complete search history.

(56) References Cited

U.S. PATENT DOCUMENTS

2022/0140961 A1* 5/2022 Zhang ................. H04W 52/242
                                                               370/330
2023/0030324 A1* 2/2023 Ali ........................ H04L 5/0053
                              (Continued)

FOREIGN PATENT DOCUMENTS

CN            111245493 A       6/2020
CN            113068262 A       7/2021
WO      WO-2021109345 A1      6/2021

OTHER PUBLICATIONS

Reconfigurable Intelligent Surfaces for 6G Systems: Principles, Applications, and Research Directions; Pan et al.; IEEE Communications Magazine ( vol. 59, Issue: 6, Jun. 2021) (Year: 2021).*
(Continued)

*Primary Examiner* — Benjamin H Elliott, IV
(74) *Attorney, Agent, or Firm* — QUALCOMM Incorporated

(57)                    ABSTRACT

Various aspects of the present disclosure generally relate to wireless communication. In some aspects, a user equipment (UE) may receive configuration information identifying a set of sub-bands for receiving, via a set of reconfigurable intelligent surfaces (RISs), a signal. The UE may receive, via a first RIS of the set of RISs, the signal in a first sub-band of the set of sub-bands. The UE may receive, via a second RIS of the set of RISs, the signal in a second sub-band of the set of sub-bands. The UE may transmit, based at least in part on receiving the signal, RIS information indicating at least one of: first RIS information regarding the first RIS, or second RIS information regarding the second RIS. Numerous other aspects are described.

30 Claims, 9 Drawing Sheets

(56)                 References Cited

U.S. PATENT DOCUMENTS

| | | | | |
|---|---|---|---|---|
| 2023/0074103 | A1* | 3/2023 | Liu | H04B 7/04013 |
| 2023/0176174 | A1* | 6/2023 | Penna | H01Q 3/46 |
| | | | | 342/451 |
| 2023/0261718 | A1* | 8/2023 | Zhuang | H04B 7/06956 |
| | | | | 455/422.1 |
| 2023/0308139 | A1* | 9/2023 | Baligh | H04B 7/04013 |
| 2023/0308140 | A1* | 9/2023 | Baligh | H04B 7/04013 |
| 2023/0403058 | A1* | 12/2023 | Khan Beigi | H04L 5/0048 |
| 2024/0154646 | A1* | 5/2024 | Wang | H01Q 19/104 |
| 2024/0235623 | A1* | 7/2024 | Sahraei | H04B 7/0456 |
| 2024/0243780 | A1* | 7/2024 | Sahraei | H04B 7/022 |
| 2024/0413858 | A1* | 12/2024 | Mcmenamy | H04W 24/10 |

OTHER PUBLICATIONS

"Joint Beamforming and Reconfigurable Intelligent Surface Design for Two-Way Relay Networks"; Wang et al.; GLOBECOM 2020—2020 IEEE Global Communications Conference; Feb. 15, 2021 (Year: 2021).*

"Intelligent Reflecting Surface-Aided Wireless Communications: A Tutorial"; Wu et al.; IEEE Transactions On Communications, vol. 69, No. 5, May 2021 (Year: 2021).*

"Reconfigurable Intelligent Surface (RIS) in the Sub-6 GHz Band: Design, Implementation, and Real-World Demonstration"; Araghi et al.; Digital Object Identifier 10.1109/ACCESS.2022.3140278; Jan. 4, 2022 (Year: 2022).*

"Reconfigurable Intelligent Surface (RIS)-Enhanced Two-Way OFDM Communications"; Pradhan et al.; IEEE Transactions On Vehicular Technology, vol. 69, No. 12, Dec. 2020 (Year: 2020).*

"Adaptive Transmission for Reconfigurable Intelligent Surface-Assisted OFDM Wireless Communications"; Lin et al.; IEEE Journal on Selected Areas in Communications ( vol. 38, Issue: 11, Nov. 2020) (Year: 2020).*

International Search Report and Written Opinion—PCT/CN2021/105729—ISA/EPO—Mar. 28, 2022.

Pan, Y., et al., "UAV-Assisted and Intelligent Reflecting Surfaces-Supported Terahertz Communications", IEEE Wireless Communications Letters, vol. 10, No. 6, Mar. 3, 2021, pp. 1-5.

Zhang, Z.Y., et al., "Future Wireless Communication Assisted by Intelligent Reflecting Surface: State of Art and Prospects", ACTA Aeronautica et Astronautica Sinica, vol. 43, No. 2, Feb. 25, 2022, pp. 1-15.

ZTE, et al., "Support of Reconfigurable Intelligent Surface for 5G Advanced", 3GPP Draft, 3GPP TSG RAN Meeting #91e, RP-210618, Electronic Meeting, Mar. 16, 2021-Mar. 21, 2021, Mar. 15, 2021, 7 Pages, the whole document, pp. 2-6.

* cited by examiner

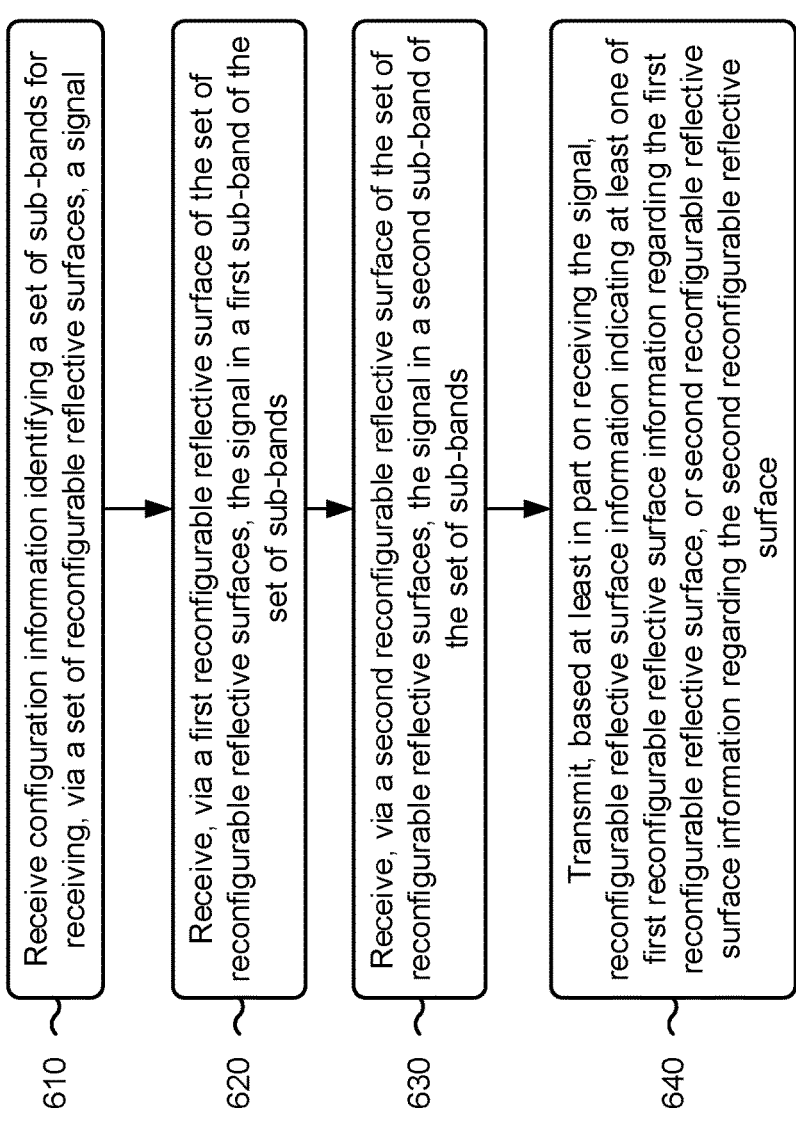

610 Receive configuration information identifying a set of sub-bands for receiving, via a set of reconfigurable reflective surfaces, a signal 620 Receive, via a first reconfigurable reflective surface of the set of reconfigurable reflective surfaces, the signal in a first sub-band of the set of sub-bands 630 Receive, via a second reconfigurable reflective surface of the set of reconfigurable reflective surfaces, the signal in a second sub-band of the set of sub-bands 640 Transmit, based at least in part on receiving the signal, reconfigurable reflective surface information indicating at least one of first reconfigurable reflective surface information regarding the first reconfigurable reflective surface, or second reconfigurable reflective surface information regarding the second reconfigurable reflective surface

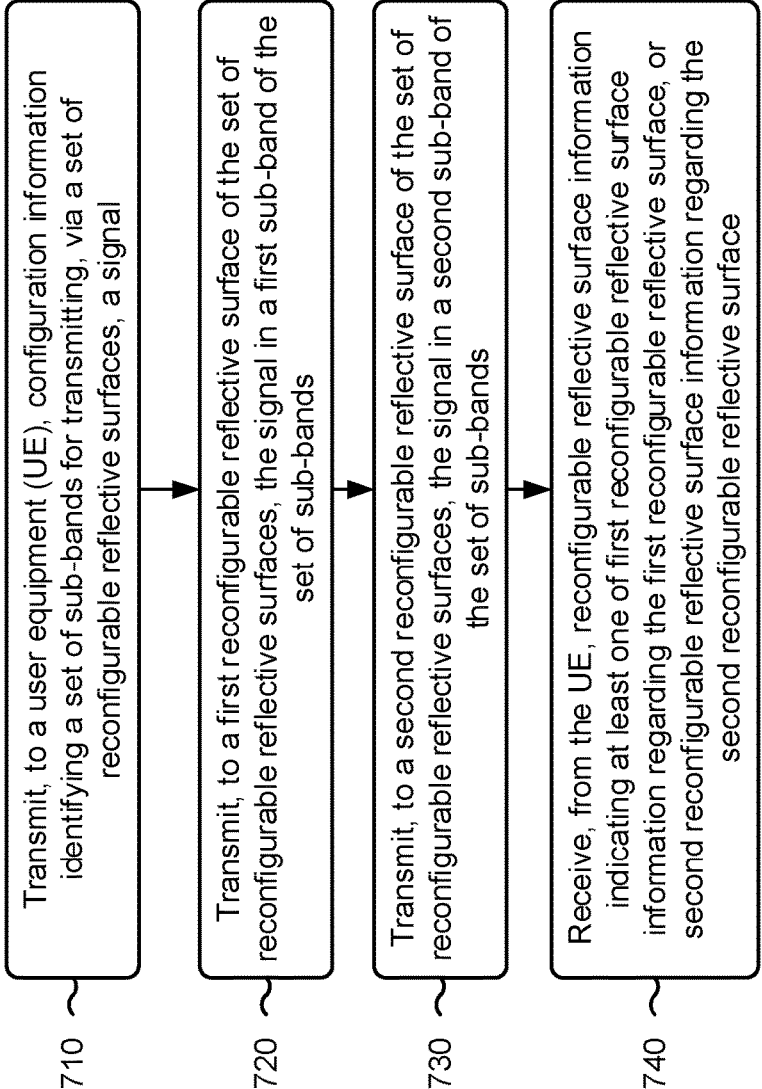

710  Transmit, to a user equipment (UE), configuration information identifying a set of sub-bands for transmitting, via a set of reconfigurable reflective surfaces, a signal 720  Transmit, to a first reconfigurable reflective surface of the set of reconfigurable reflective surfaces, the signal in a first sub-band of the set of sub-bands 730  Transmit, to a second reconfigurable reflective surface of the set of reconfigurable reflective surfaces, the signal in a second sub-band of the set of sub-bands 740  Receive, from the UE, reconfigurable reflective surface information indicating at least one of first reconfigurable reflective surface information regarding the first reconfigurable reflective surface, or second reconfigurable reflective surface information regarding the second reconfigurable reflective surface

PASSIVE COMMUNICATION VIA MULTIPLE REFLECTIVE SURFACES

CROSS-REFERENCE TO RELATED APPLICATION

This Patent Application is a 371 national stage of PCT Application No. PCT/CN2021/105729 filed on Jul. 12, 2021, entitled "PASSIVE COMMUNICATION VIA MULTIPLE REFLECTIVE SURFACES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for passive communication via multiple reflective surfaces.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive configuration information identifying a set of sub-bands for receiving, via a set of reconfigurable reflective surfaces, a signal. The one or more processors may be configured to receive, via a first reconfigurable reflective surface of the set of reconfigurable reflective surfaces, the signal in a first sub-band of the set of sub-bands. The one or more processors may be configured to receive, via a second reconfigurable reflective surface of the set of reconfigurable reflective surfaces, the signal in a second sub-band of the set of sub-bands. The one or more processors may be configured to transmit, based at least in part on receiving the signal, reconfigurable reflective surface information indicating at least one of first reconfigurable reflective surface information regarding the first reconfigurable reflective surface, or second reconfigurable reflective surface information regarding the second reconfigurable reflective surface.

Some aspects described herein relate to a base station for wireless communication. The base station may include a memory and one or more processors coupled to the memory. The one or more processors may be configured to transmit, to a user equipment (UE), configuration information identifying a set of sub-bands for transmitting, via a set of reconfigurable reflective surfaces, a signal. The one or more processors may be configured to transmit, to a first reconfigurable reflective surface of the set of reconfigurable reflective surfaces, the signal in a first sub-band of the set of sub-bands. The one or more processors may be configured to transmit, to a second reconfigurable reflective surface of the set of reconfigurable reflective surfaces, the signal in a second sub-band of the set of sub-bands. The one or more processors may be configured to receive, from the UE, reconfigurable reflective surface information indicating at least one of first reconfigurable reflective surface information regarding the first reconfigurable reflective surface, or second reconfigurable reflective surface information regarding the second reconfigurable reflective surface.

Some aspects described herein relate to a non-transitory computer-readable medium that stores a set of instructions for wireless communication by a user equipment (UE). The set of instructions, when executed by one or more processors of the UE, may cause the UE to receive configuration information identifying a set of sub-bands for receiving, via a set of reconfigurable reflective surfaces, a signal. The set of instructions, when executed by one or more processors of the UE, may cause the UE to receive, via a first reconfigurable reflective surface of the set of reconfigurable reflective surfaces, the signal in a first sub-band of the set of sub-bands. The set of instructions, when executed by one or more processors of the UE, may cause the UE to receive, via a second reconfigurable reflective surface of the set of reconfigurable reflective surfaces, the signal in a second sub-band of the set of sub-bands. The set of instructions, when executed by one or more processors of the UE, may cause the UE to transmit, based at least in part on receiving the signal, reconfigurable reflective surface information indicating at least one of first reconfigurable reflective surface information regarding the first reconfigurable reflective surface, or second reconfigurable reflective surface information regarding the second reconfigurable reflective surface.

Some aspects described herein relate to a non-transitory computer-readable medium that stores a set of instructions for wireless communication by a base station. The set of instructions, when executed by one or more processors of the base station, may cause the base station to transmit, to a user equipment (UE), configuration information identifying a set of sub-bands for transmitting, via a set of reconfigurable reflective surfaces, a signal. The set of instructions, when executed by one or more processors of the base station, may cause the base station to transmit, to a first reconfigurable reflective surface of the set of reconfigurable reflective surfaces, the signal in a first sub-band of the set of sub-bands. The set of instructions, when executed by one or more processors of the base station, may cause the base station to transmit, to a second reconfigurable reflective surface of the set of reconfigurable reflective surfaces, the signal in a second sub-band of the set of sub-bands. The set of instructions, when executed by one or more processors of the base station, may cause the base station to receive, from the UE, reconfigurable reflective surface information indicating at least one of first reconfigurable reflective surface information regarding the first reconfigurable reflective surface, or second reconfigurable reflective surface information regarding the second reconfigurable reflective surface.

Some aspects described herein relate to an apparatus for wireless communication. The apparatus may include means for receiving configuration information identifying a set of sub-bands for receiving, via a set of reconfigurable reflective surfaces, a signal. The apparatus may include means for receiving, via a first reconfigurable reflective surface of the set of reconfigurable reflective surfaces, the signal in a first sub-band of the set of sub-bands. The apparatus may include means for receiving, via a second reconfigurable reflective surface of the set of reconfigurable reflective surfaces, the signal in a second sub-band of the set of sub-bands. The apparatus may include means for transmitting, based at least in part on receiving the signal, reconfigurable reflective surface information indicating at least one of, first reconfigurable reflective surface information regarding the first reconfigurable reflective surface, or second reconfigurable reflective surface information regarding the second reconfigurable reflective surface.

Some aspects described herein relate to an apparatus for wireless communication. The apparatus may include means for transmitting, to a user equipment (UE), configuration information identifying a set of sub-bands for transmitting, via a set of reconfigurable reflective surfaces, a signal. The apparatus may include means for transmitting, to a first reconfigurable reflective surface of the set of reconfigurable reflective surfaces, the signal in a first sub-band of the set of sub-bands. The apparatus may include means for transmitting, to a second reconfigurable reflective surface of the set of reconfigurable reflective surfaces, the signal in a second sub-band of the set of sub-bands. The apparatus may include means for receiving, from the UE, reconfigurable reflective surface information indicating at least one of, first reconfigurable reflective surface information regarding the first reconfigurable reflective surface, or second reconfigurable reflective surface information regarding the second reconfigurable reflective surface.

Some aspects described herein relate to a method of wireless communication performed by a user equipment (UE). The method may include receiving configuration information identifying a set of sub-bands for receiving, via a set of reconfigurable reflective surfaces, a signal. The method may include receiving, via a first reconfigurable reflective surface of the set of reconfigurable reflective surfaces, the signal in a first sub-band of the set of sub-bands. The method may include receiving, via a second reconfigurable reflective surface of the set of reconfigurable reflective surfaces, the signal in a second sub-band of the set of sub-bands. The method may include transmitting, based at least in part on receiving the signal, reconfigurable reflective surface information indicating at least one of first reconfigurable reflective surface information regarding the first reconfigurable reflective surface, or second reconfigurable reflective surface information regarding the second reconfigurable reflective surface.

Some aspects described herein relate to a method of wireless communication performed by a base station. The method may include transmitting, to a user equipment (UE), configuration information identifying a set of sub-bands for transmitting, via a set of reconfigurable reflective surfaces, a signal. The method may include transmitting, to a first reconfigurable reflective surface of the set of reconfigurable reflective surfaces, the signal in a first sub-band of the set of sub-bands. The method may include transmitting, to a second reconfigurable reflective surface of the set of reconfigurable reflective surfaces, the signal in a second sub-band of the set of sub-bands. The method may include receiving, from the UE, reconfigurable reflective surface information indicating at least one of first reconfigurable reflective surface information regarding the first reconfigurable reflective surface, or second reconfigurable reflective surface information regarding the second reconfigurable reflective surface.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6 and 7 are diagrams illustrating example processes associated with passive communication via multiple reflective surfaces, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
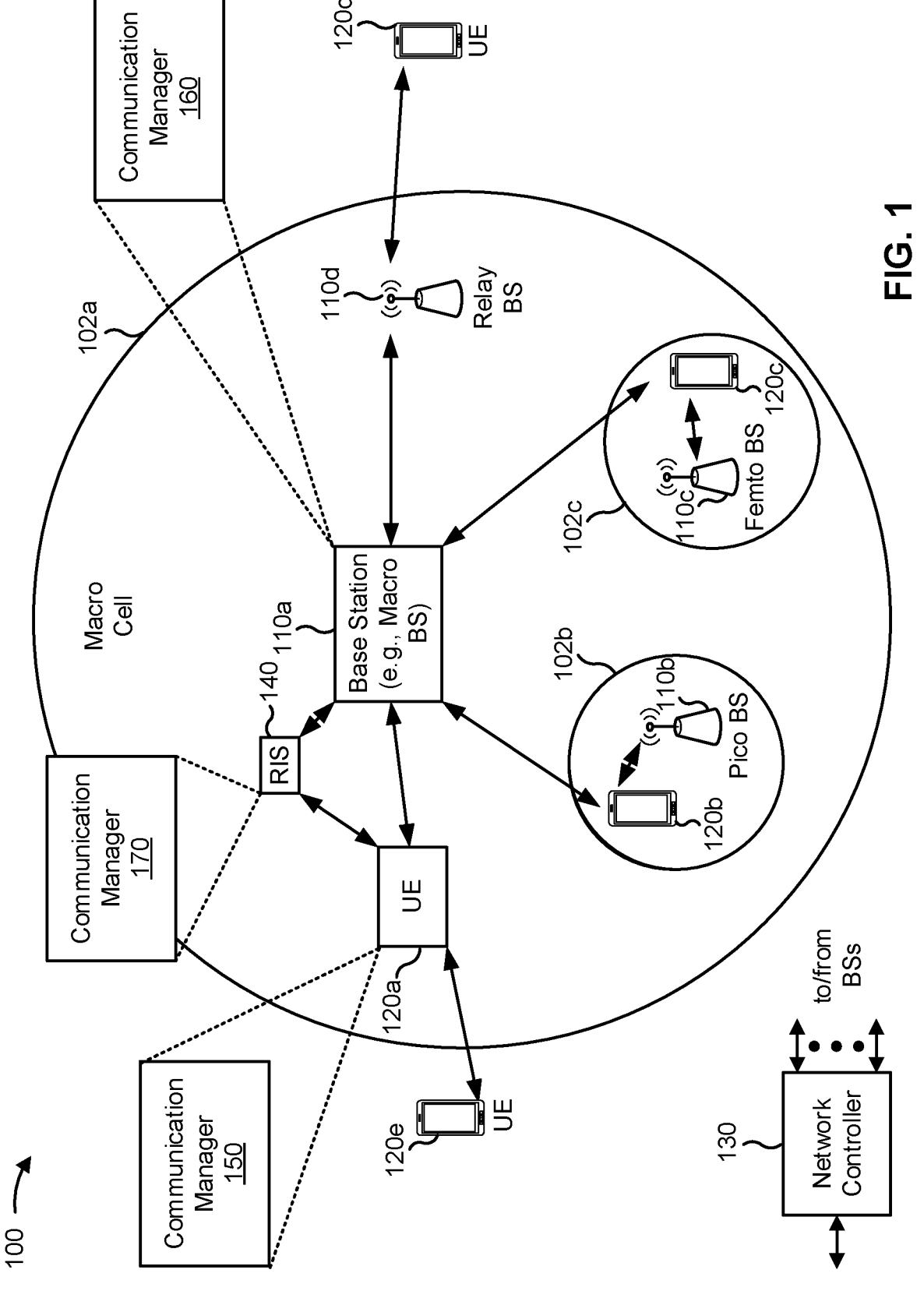
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown)

in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110. In some aspects, a reconfigurable intelligent surface (RIS) 140 may relay or reflect transmissions between UEs 120 or between a UE 120 and a base station 110. The RIS 140 is described in more detail in connection with FIG. 5.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 150. As described in more detail elsewhere herein, the communication manager 150 may perform one or more operations associated with RIS participation in a communication. Additionally, or alternatively, the communication manager 150 may perform one or more other operations described herein.

In some aspects, the base station 110 may include a communication manager 160. As described in more detail elsewhere herein, the communication manager 160 may perform one or more operations associated with RIS participation in a communication. Additionally, or alternatively, the communication manager 160 may perform one or more other operations described herein.

In some aspects, the RIS 140 may include a communication manager 170. As described in more detail elsewhere herein, the communication manager 170 may perform one or more operations associated with RIS participation in a communication. Additionally, or alternatively, the communication manager 170 may perform one or more other operations described herein.

As indicated above, FIG. 1 is provided as an example. Other examples may differ from what is described with regard to FIG. 1.

Figure 2:
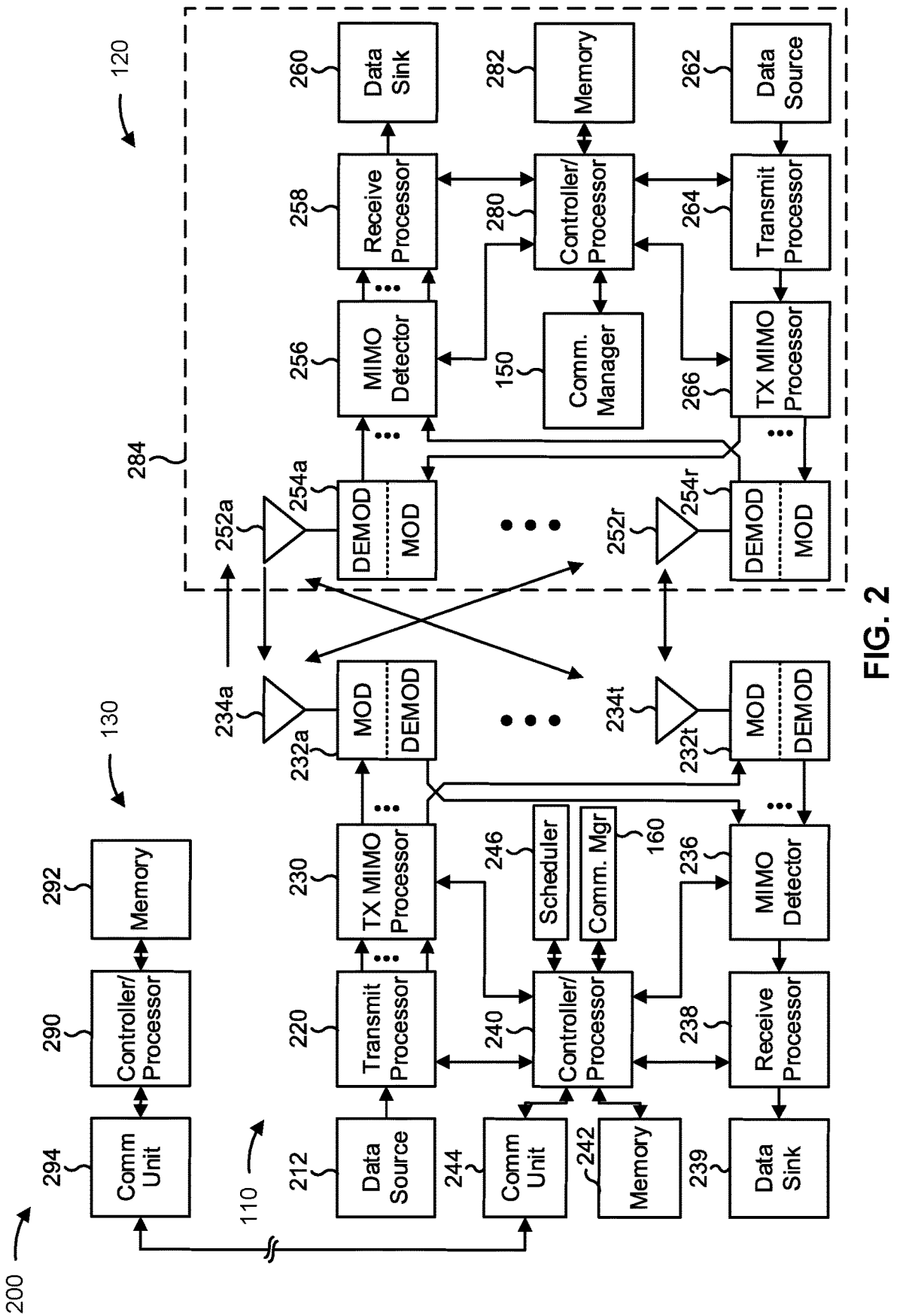
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the base station 110, the controller/processor 280 of the UE 120, and/or any other component(s) of FIG. 2 may perform one or more techniques associated with passive communication via multiple reflective surfaces, as described in more detail elsewhere herein. The controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE includes means for receiving configuration information identifying a set of sub-bands for receiving, via a set of RISs, a signal; means for receiving, via a first RIS of the set of RISs, the signal in a first sub-band of the set of sub-bands; means for receiving, via a second RIS of the set of RISs, the signal in a second sub-band of the set of sub-bands; and/or means for transmitting, based at least in part on receiving the signal, RIS information indicating at least one of: first RIS information regarding the first RIS, or second RIS information regarding the second RIS. The means for the UE to perform operations described herein may include, for example, one or more of communication manager 150, antenna 252, modem 254, MIMO detector 256, receive processor 258, transmit processor 264, TX MIMO processor 266, controller/processor 280, or memory 282.

In some aspects, the base station includes means for transmitting, to a UE, configuration information identifying a set of sub-bands for transmitting, via a set of RISs, a signal; means for transmitting, to a first RIS of the set of RISs, the signal in a first sub-band of the set of sub-bands; means for transmitting, to a second RIS of the set of RISs, the signal in a second sub-band of the set of sub-bands; and/or means for receiving, from the UE, RIS information indicating at least one of: first RIS information regarding the first RIS, or second RIS information regarding the second RIS. The means for the base station to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
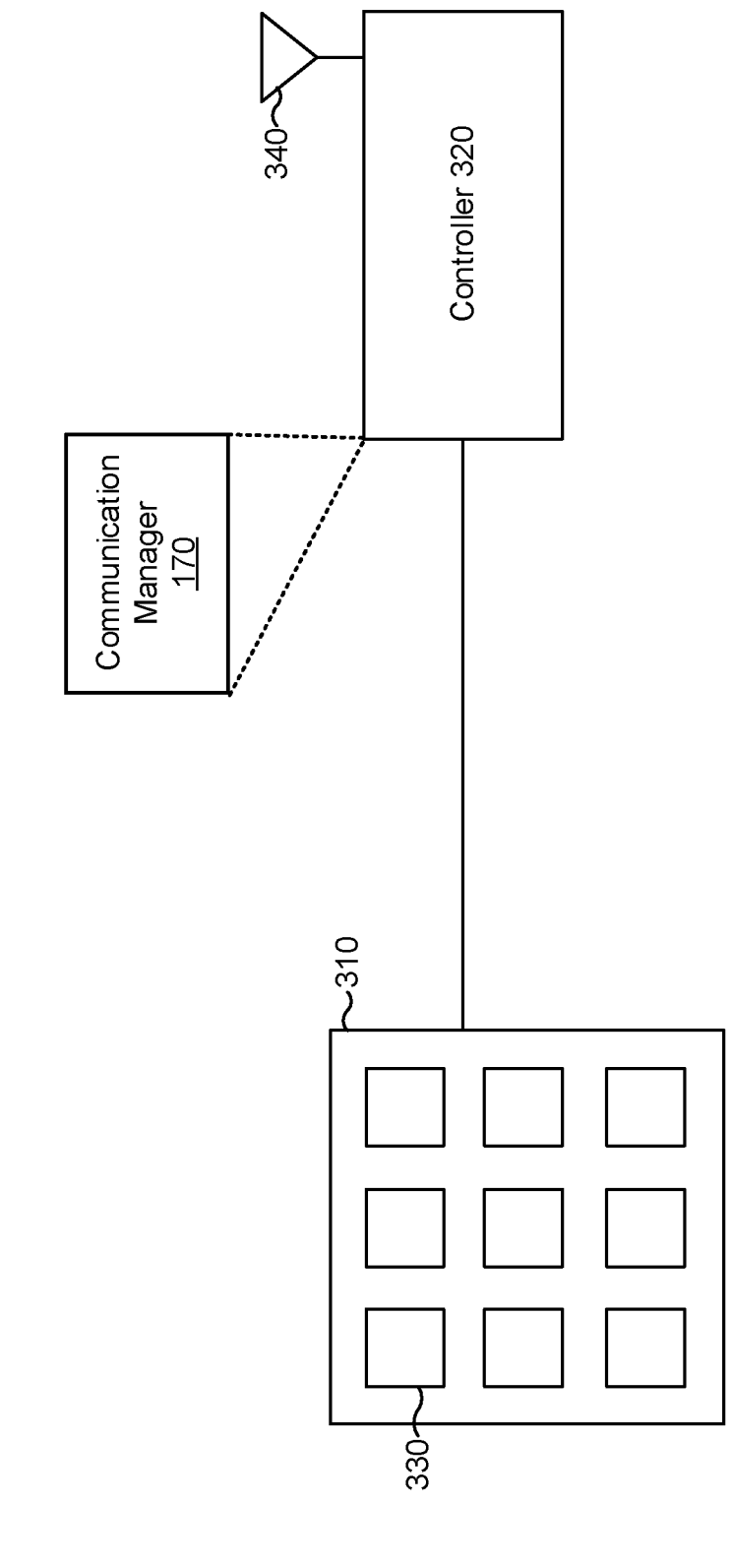
FIG. 3 is a diagram illustrating an example of a surface and a controller of a RIS, in accordance with the present disclosure.

FIG. 3 is a diagram illustrating a surface 310 and a controller 320 of a RIS 140, in accordance with the present disclosure. Some wireless communication systems have used active antenna units (AAUs) to increase throughput and increase quantities of wireless devices (e.g., UEs) that can be served by the wireless communication system. In some cases, AAUs may be communicatively coupled with a base station and may relay (e.g., reflect) transmissions between the base station and UEs. In this regard, AAUs may provide for high beamforming gain for communications within the wireless communication system and may enable a base station to circumvent obstructions which would otherwise interrupt wireless communication. However, AAUs may result in high power consumption and may therefore be undesirable for widespread use. One alternative to an AAU is a passive or near passive device, such as a RIS 140, a channel engineering device (CED), a configurable deflector, or the like. It should be understood that references herein to a RIS 140 can also apply to other types of passive or near passive devices. In some aspects, a RIS 140 may relay (e.g., reflect) transmissions between base stations and/or UEs via one or more reflective elements 330. As compared to AAUs, RISs are passive devices. Therefore, RISs may be associated with little to no power consumption, thereby improving power efficiency of the network.

A RIS 140 may reflect RF signals (e.g., an impinging wave) incident on the surface 310. The reflective property of a RIS 140 may be used to relay the RF signals from a transmitting device to a receiving device. Thus, a RIS 140 may be used to increase throughput, improve beamforming gain, and circumvent obstructions to increase a quantity of UEs that can be served by the network. A direction (such as an angle of reflection) and phase of the reflection of the RF signals can be controlled by a set of reflective elements 330. Nine reflective elements 330 are shown in FIG. 3, though the RIS 140 can include any number of reflective elements. The RIS 140 may be said to be "reconfigurable" because a phase and/or angle of reflection of signals incident on each of the reflective elements 330, and therefore an accumulative phase and/or angle of reflection of RF signals incident on the RIS 140, may be selectively adjustable. In particular, a precoder configuration (e.g., reflection matrix configuration) associated with the RIS 140 may include a set of precoders associated with the set of reflective elements 330, where each reflective element 330 is associated with a respective precoder.

In some aspects, the RIS 140 may be associated with a set of precoder configurations, where each precoder configuration may be represented by a vector r including a quantity of terms $r_i$ representing precoders or reflective coefficients, and where i is equivalent to a quantity of reflective elements 330 of the RIS 140. In other words, a vector r for a RIS 140 including nine reflective elements 210 (e.g., i=9) may include nine terms (e.g., $r_1$ through $r_9$). Due to the fact that the RIS 140 includes a passive device which does not perform any signal amplification, each term $r_i$ may include a complex number satisfying $|r_i| \leq 1$. In some aspects, the vector r may be used to generate a diagonal matrix R, in which the diagonal elements of R include the terms $r_i$ of the vector r. In some aspects, the diagonal matrix R may be referred to as a precoder matrix of the reconfigurable surface 205-*a*. A precoder matrix (e.g., for a given UE 120 or a given direction), which may be referred to herein as a reflective matrix, is represented by the symbol $\phi$. $-\phi$ (negative phi) indicates a reflective matrix with a phase rotation of $\pi$ radians. The reflective matrix for a given UE 120 or a given direction may be obtained by configuration of the RIS 140 (such as by the base station 110) and/or by training. A reflective matrix may be referred to herein as a configuration matrix.

In some aspects, the phase and/or angle of reflection for each reflective element 330 may be adjusted by adjusting a resistance, a reactance, or both, of each respective reflective element 330. Accordingly, a precoder associated with each reflective element 330 may include a set of parameters associated with the reflective element 330, including an orientation of the reflective element 330, a resistance and/or reactance of the reflective element 330, or any combination thereof. In this regard, the RIS 140 may be configured (by the controller 320) to modify an angle of reflection of signals incident on the RIS 140 based on the precoders associated with each of the reflective elements 330, by modifying a precoder configuration used by the RIS 140, by transitioning from a first precoder configuration to a second precoder configuration, or any combination thereof.

In addition to angle of reflection (used interchangeably herein with "direction"), the RIS 140 may be capable of modifying the phase of a reflected RF signal. The phase of the reflected RF signal may be controlled by the reflective elements 330 and may be specified by the reflective matrix. The phase of a reflected RF signal can be modified without modifying the direction of the reflected RF signal if the relative phase of each of the reflective elements 330 (relative to each other) is held constant. For example, a first RF signal can be transmitted with a phase of 0 radians and a second RF signal can be transmitted with a phase of $\pi$ radians if the collective phase of the reflective elements 330 is modified to reflect the second RF signal with the phase of $\pi$ radians (so long as the phases of the reflective elements 330 relative to each other are held constant). This difference in phase can be used to communicate information via a reflected RF signal, as described in more detail elsewhere herein. One or more of the above types of information (e.g., precoder configuration, precoder, precoder matrix, reflective matrix, etc.) may be referred to herein as a set of parameters, "phase information," or a phase configuration.

As mentioned above, a RIS 140 can modify a reflected RF signal to communicate information. Information communicated by a RIS 140 via a reflected reference signal (RS) is referred to herein as "RIS information." "RIS information" may be referred to herein as reconfigurable reflective surface information. RIS information can include, as just some examples, an acknowledgment (ACK) or negative ACK (NACK) regarding configuration information transmitted to a RIS 140 by a base station 110, an ACK/NACK regarding a precoder configuration, information regarding channel quality on one or more communication links (such as between the RIS 140 and the base station 110, or between the RIS 140 and a UE 120), and information indicating that the RIS 140 is present in the network.

In some aspects, the RIS 140 may convey RIS information by modifying a phase of a reflected signal, such as by modifying a phase of a first reference signal of the reflected signal relative to a phase of a second reference signal of the reflected signal. A receiver of the reflected RF signal may be able to detect information bits of the RIS information based at least in part on the relative phases of the reference signals of the reflected RF signal. This approach may be referred to as "phase shift keying." In some cases, a RIS 140 may use binary phase shift keying (BPSK) to communicate one bit of information (e.g., ACK, NACK, or another feedback bit). For instance, a transmitter may be configured to transmit two reference signals (e.g., in two separate symbols) to a receiver via the RIS 140. The RIS 140 may reflect the first reference signal according to a first configuration ($\phi_1$). In some cases, the first configuration may be an optimal configuration indicated by the receiver (e.g., $\phi_1 = \Phi$). In some cases, both the first configuration and the second configuration may be optimal configurations. In a first case (e.g., to communicate ACK or other feedback), the RIS 140 may reflect the second reference signal according to a second configuration ($\Phi_2$), where $\Phi_2$ is phase shifted relative to $\Phi_1$ (e.g., $\Phi_2 = -101_1$). In such an example, the estimated channel for the first reference signal may be $\widehat{H_1} \approx H_{r1} \Phi_1 H_{r2}$ and the estimated channel for the second reference signal may be $\widehat{H_2} \approx H_{r1}(-\Phi_1) H_{r2}$. Thus, in the first case, a receiver may detect $\widehat{H_2} = -\widehat{H_1}$. In a second case (e.g., to communicate NACK or other feedback), the RIS 140 may reflect the second reference signal according to a second configuration ($\Phi_2$) that is the same as the first configuration used to reflect the first reference signal (e.g., $\Phi_2 = \Phi_1$). In such a case, the estimated channel for the first reference signal may be $\widehat{H_1} \approx H_{r1} \Phi_1 H_{r2}$ and the estimated channel for the second reference signal may be $\widehat{H_2} \approx H_{r1} \Phi_1 H_{r2}$. Thus, in the second case, a receiver may detect $\widehat{H_2} = \widehat{H_1}$. In some instances, a receiver may determine feedback based on determining whether $\widehat{H_2} = -\widehat{H_1}$ or $\widehat{H_2} = \widehat{H_1}$. Stated alternatively, a receiver may test two hypotheses ($\widehat{H_2} = -\widehat{H_1}$ and $\widehat{H_2} = \widehat{H_1}$) to determine the feedback communicated by the RIS 140. For example, in the first case (e.g., where $\widehat{H_2} = -\widehat{H_1}$), the receiver may determine that the RIS 140 communicated a first feedback (e.g., ACK), and in the second case (e.g., where $\widehat{H_2} = \widehat{H_1}$), the receiver may determine that the RIS 140 communicated a second feedback (e.g., NACK). In some instances, the techniques described herein may be generalized to higher-order PSK (e.g., quadrature PSK) such that more than one bit of information may be communicated by the RIS 140. For example, a RIS 140 may use more than two reference signals or more than one reflective matrix (i.e., more than one $\Phi$) to reflect each of the two reference signals.

In some aspects, the RIS 140 may convey RIS information by modifying a beam width or a scattering configuration of the RIS 140. For example, the RIS 140 may reflect a first reference signal using a first reflective matrix $\Phi$, and may reflect a second reference signal using a second reflective matrix $\Omega$. In some aspects, the second reflective matrix may be configured to scatter the second reference signal to a higher degree than the first reflective matrix. For example, the first reflective matrix may be an optimal configuration and values of the second reflective matrix may be orthogonal to values of the first reflective matrix. Additionally, or alternatively, the second reflective matrix may configure orthogonal signaling over a set of signals. In some aspects, the RIS 140 may convey RIS information by deactivating the reflective property of the RIS 140 during one or more time periods. In some examples, $\Omega$ may a be a scatter configuration. For example, $\Omega$ may configure reflective elements included in the RIS 140 such that signals reflected by the RIS 140 are scattered (i.e., reflected in all directions) and the likelihood of the receiver receiving the signal is low. In some other examples, $\Omega$ may configure reflective elements included in the RIS 140 such that signals reflected by the RIS 140 are wider (i.e., more diffuse) than beams reflected according to $\Phi$. In yet another example, a RIS 140 may turn off (e.g., deactivate) and not reflect one or more signals towards a receiver. The receiver may perform reference signal receive power (RSRP) measurements on signals (e.g., reference signals) transmitted from a transmitter via the RIS 140. In some cases, RSRP values measured for reference signals reflected according to $\Phi$ may be higher than RSRP values measured for reference signals reflected according to $\Omega$ or signals which are not reflected by the RIS 140 at all. Therefore, a receiver may detect one or more bits of information communicated by a RIS 140 based at least in part on comparing RSRP measurements of two or more reference signals.

In some aspects, the RIS 140 may convey RIS information by selecting an antenna panel (sometimes referred to as an antenna array) to receive a reflected RF signal. For example, a first antenna panel (e.g., of a base station 110) may be associated with a first RIS information value, and a second antenna panel (e.g., of the base station 110) may be associated with a second RIS information value. The RIS 140 may select whether to reflect an RF signal to the first antenna panel or the second antenna panel based at least in part on whether the RIS 140 is to communicate the first RIS information value or the second RIS information value. Additionally, or alternatively, the RIS 140 can use code division multiple access (CDMA) across multiple antennas or antenna panels to increase the RIS information capacity of a reflected RF signal. In some examples, a receiver may include a first antenna array and a second antenna array. In some cases, the RIS 140 may be configured by a base station 110 (e.g., via control signaling) with a first configuration ($\Phi_1$) for the first antenna array and a second configuration ($\Phi_2$) for the second antenna array. In some cases, $\Phi_1$ may include phase information for reflective elements included in the RIS 140 such that signals transmitted to the RIS 140 are reflected towards the first antenna array. Similarly, $\Phi_2$ may include phase information for reflective elements included in the RIS 140 such that signals transmitted to the RIS 140 are reflected towards the second antenna array. Thus, the receiver may determine feedback communicated by the RIS 140 based on the antenna array at which reference signals are detected. Stated alternatively, the receiver may determine whether the RIS 140 is communicating ACK, NACK, or other feedback based on comparing the receive energy over the two antenna arrays.

In at least some of the above examples, the RIS information capacity of a reflected RF signal may be proportionate to the number of reference signal symbols included in the reflected RF signal, since the RIS 140 can convey RIS information by modifying a configuration used to reflect a reference signal at a particular symbol. Furthermore, increasing the number of reference signal symbols may improve the reliability of ACK/NACK transmission. For example, in a situation where the optimal RIS configuration (e.g., reflective matrix) is $\Phi$, the RIS 140 can transmit a sequence of bits $\{b_2, b_3, \ldots, b_N\}$ (where $b_i \in \{0,1\}$) via ($\Phi_1$, $\Phi_2$, $\Phi_3 \ldots, \Phi_N$)=($\Phi$, $e^{j\alpha\pi b_2}\Phi$, $e^{j\alpha\pi b_3}\Phi$, $\ldots$, $e^{j\alpha\pi b_N}\Phi$). Here, $-1 \le \alpha \le 1$ may be based at least in part on a physical limitation of the RIS 140 or another factor, and may be known to the base station 110 that configures the RIS 140.

Some forms of RIS information may be beneficial for a base station, such as ACK/NACKs regarding configuration of a RIS or reception of a reflective matrix, information regarding channel conditions on one or more links associated with the RIS 140, or the like. In some deployments, a base station may be associated with multiple RISs. It may be beneficial for the base station to have RIS information regarding each of the multiple RISs. For example, the base station may schedule communications to be reflected via each of the RISs so that each of the RISs can convey RIS information to the base station. For example, the communications may be transmitted by one or more UEs, and may be reflected by each of the RISs to the base station to convey RIS information. However, if each of these communications is scheduled in a different time slot (e.g., using time division duplexing), there may be significant overhead and latency involved with the signaling of RIS information, particularly for large numbers of RISs or communications involving a relatively small number of reference signals and thus a relatively low RIS information capacity.

Some techniques and apparatuses described herein provide sub-band communication to facilitate communication of RIS information by multiple RISs 140. For example, a base station may transmit a signal using sub-band precoding, in which a first sub-band (e.g., a first portion of a bandwidth of the signal) is transmitted to a first RIS 140 and a second sub-band (e.g., a second portion of a bandwidth of the signal) is transmitted to a second RIS 140. The first RIS 140 and the second RIS 140 may each reflect the signal to one or more receivers, such as one or more UEs, and may convey RIS information to the one or more receivers via the respective sub-bands of the signal. The one or more receivers may determine the RIS information, and may provide the RIS information to the base station 110, such as via a direct (e.g., non-reflected) transmission or a transmission reflected via one or more RISs. In this way, a base station 110 can determine RIS information regarding multiple RISs using overlapped time resources, which reduces overhead and latency associated with determining RIS information. Furthermore, the determination of the RIS information regarding the multiple RISs 140 may improve the accuracy of channel estimation and ACK/NACK feedback regarding the configuration and operation of the RISs 140.

The controller 320 may control the reflective elements 330 of the surface 310. For example, the controller 320 may select the reflective matrix used to configure the reflective elements 330. Additionally, the controller 320 may apply a set of parameters associated with each reflective element 330, as specified by the reflective matrix, to the reflective elements 330. For example, the controller 320 may configure an orientation of a reflective element 330, a resistance and/or reactance of the reflective element 330, or the like. The controller 320 may select a reflective matrix based at least in part on a timeline. For example, the controller 320 may receive configuration information indicating a time at which a particular reflective matrix is to be used or indicating a time at which a reflective matrix is to be modified. As one example, the techniques and apparatuses described herein provide for the controller 320 to apply a different reflective matrix for a first DMRS of a data channel (that is, at a time associated with the first DMRS) than for a second DMRS of the data channel (that is, at a time associated with the second DMRS) such that the second DMRS is phase rotated relative to the first DMRS.

In some aspects, the controller 320 may be capable of configuring multiple different reflective matrixes in sequence. For example, the controller 320 may use a first reflective matrix to direct a communication to a UE. The controller 320 may determine whether the communication was successfully directed to the UE (such as based at least in part on feedback received via an antenna 340, as described below). If the communication was not successfully directed to the UE, the controller 320 may use a second reflective matrix to direct the communication to the UE.

The controller 320 may include an antenna 340. For example, the controller 320 may include one or more components of an RF chain. The antenna 340 may enable communication with the base station 110 and/or the UE 120, such as via a radio access link or via a sidelink. For example, the base station 110 may provide configuration information (such as radio resource control (RRC) signaling, medium access control (MAC) signaling, control information, or the like) to the controller 320 via the radio access link. In some aspects, the configuration information may indicate a reflective matrix to be applied at a certain time or in accordance with a timeline.

In some aspects, the RIS 140 may include a communication manager 170. As described in more detail elsewhere herein, the communication manager 170 may perform one or more operations associated with passive communication via multiple reflective surfaces. Additionally, or alternatively, the communication manager 170 may perform one or more other operations described herein.

In some aspects, the RIS 140 may include means for receiving a signal including a plurality of DMRSs, means for configuring a set of reflective elements of the RIS such that a first DMRS of the plurality of DMRSs is reflected using a first beamformer and a second DMRS of the plurality of DMRSs is reflected using a second beamformer different than the first beamformer, or the like. In some aspects, such means may include one or more components of the RIS 140, such as controller 320 or antenna 340. In some aspects, such means may include one or more components of the UE 120 described in connection with FIG. 2, such as controller/processor 280, transmit processor 264, TX MIMO processor 266, antenna 252, modem 254, MIMO detector 256, receive processor 258, or the like. In some aspects, such means may include one or more components of the base station 110 described in connection with FIG. 2, such as antenna 234, MIMO detector 236, receive processor 238, controller/processor 240, transmit processor 220, TX MIMO processor 230, modem 232, antenna 234, or the like.

The controller 320 may include a memory and one or more processors. The memory may be a non-transitory computer readable medium storing one or more instructions (e.g., code and/or program code) for wireless communications. For example, the one or more instructions, when executed (e.g., directly, or after compiling, converting, and/or interpreting) by the controller 320, may cause the controller 320 and/or the RIS 140 to perform or direct operations of, for example, processes as described herein. In some examples, executing instructions may include running the instructions, converting the instructions, compiling the instructions, and/or interpreting the instructions, among other examples.

As indicated above, FIG. 3 is provided as an example. Other examples may differ from what is described with regard to FIG. 3.

Figure 4:
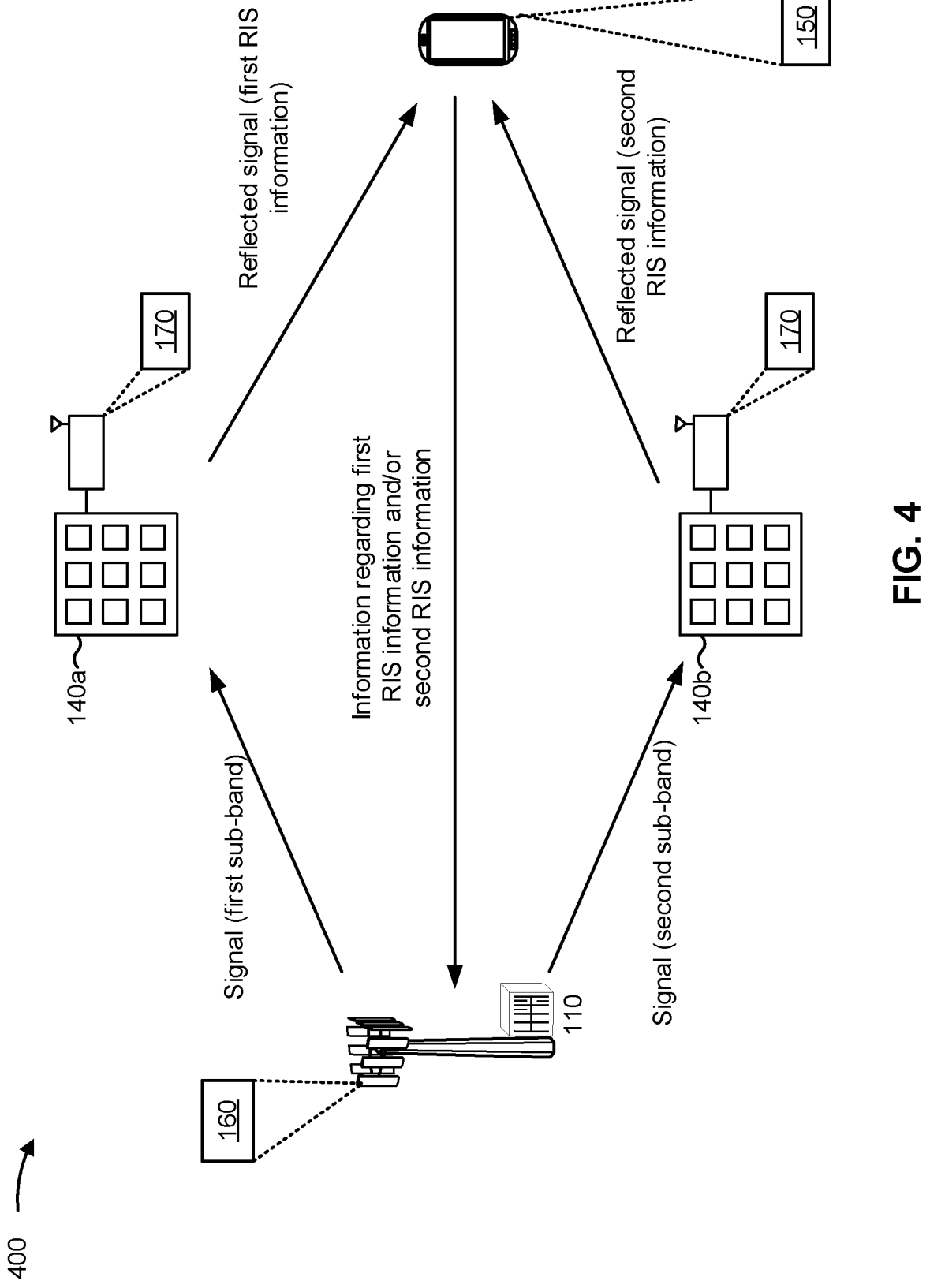
FIG. 4 is a diagram illustrating an example associated with feedback for passive communication via multiple reflective surfaces, in accordance with the present disclosure.

FIG. 4 is a diagram illustrating an example 400 of feedback for passive communication via multiple reflective surfaces, in accordance with the present disclosure. As shown in FIG. 4, a base station (e.g., a communication manager 160 of a base station 110) and a UE (e.g., a communication manager 150 of a UE 120) may communicate with one another. Communications between the base station and UE may be transmitted to one another using one or more RISs, such as a first RIS 140a and a second RIS 140b (e.g., one or more communication managers 170 of a RIS 140).

As shown by example 400, the base station 110 may transmit, and the UE may receive, a signal via a first RIS and a second RIS. For example, the base station may use beamforming to transmit the signal to the first RIS (e.g., RIS 140a) via a first sub-band of a frequency band, and transmit the same signal to the second RIS (e.g., RIS 140b) via a second sub-band of the frequency band. For example, the base station may use a first precoder for the first sub-band and a second precoder for the second sub-band.

The first RIS and the second RIS may each include a respective communication manager (e.g., 170) previously configured to configure a set of reflective elements of the respective first and second RISs, in a manner designed to cause the reflective elements to reflect the signal, received from the base station, to the UE. In the example 400, the first RIS and second RIS have also been previously configured to indicate acknowledgement or non-acknowledgement of one or more prior communications between the base station and the first RIS and/or second RIS, by using one or more passive communication methods described herein (e.g., phase key shifting, beam width modification, antenna panel targeting, and/or reference signal symbol modification). In this situation, the first RIS and second RIS may transmit to the UE, and the UE may receive from the first RIS and the second RIS, an indication regarding acknowledgment or non-acknowledgment associated with one or both of the first RIS and the second RIS. For example, when reflecting the signal to the UE, the first RIS may reflect one or more reference signals of the signal using a first sequence of phases, and the second RIS may reflect one or more reference signals of the signal using a second sequence of phases. More generally, the first RIS and the second RIS may reflect the signal using at least one of phase key shifting, beam width modification, antenna panel targeting, or reference signal symbol modification.

As further shown in example 400, the UE may be configured (e.g., by the base station via RRC or other configuration) to identify an acknowledgement or non-acknowledgement in the first sub-band and/or the second sub-band, based at least in part on the signal received from via the first RIS and/or second RIS. For example, the UE may determine first RIS information indicating acknowledgement or non-acknowledgement associated with the first RIS based at least in part on the one or more reference signals having the first sequence of phases, and the UE may determine second RIS information indicating acknowledgement or non-acknowledgement associated with the second RIS based at least in part on the one or more reference signals having the second sequence of phases.

As further shown in example 400, the UE may transmit (e.g., directly or via the first RIS and/or second RIS), and the base station may receive, information indicating the first RIS information and/or the second RIS information. For example, the UE may transmit the first RIS information and/or the second RIS information. As another example, the UE may transmit a report including or based at least in part on the first RIS information and/or the second RIS information. In this way, the UE may transmit, and the base station may receive, feedback (e.g., acknowledgement and/or non-acknowledgment, channel information regarding the channel between a RIS and another device) for communications transmitted from the base station to the first RIS and the second RIS.

As indicated above, FIG. 4 is provided as an example. Other examples may differ from what is described with respect to FIG. 4.

Figure 5:
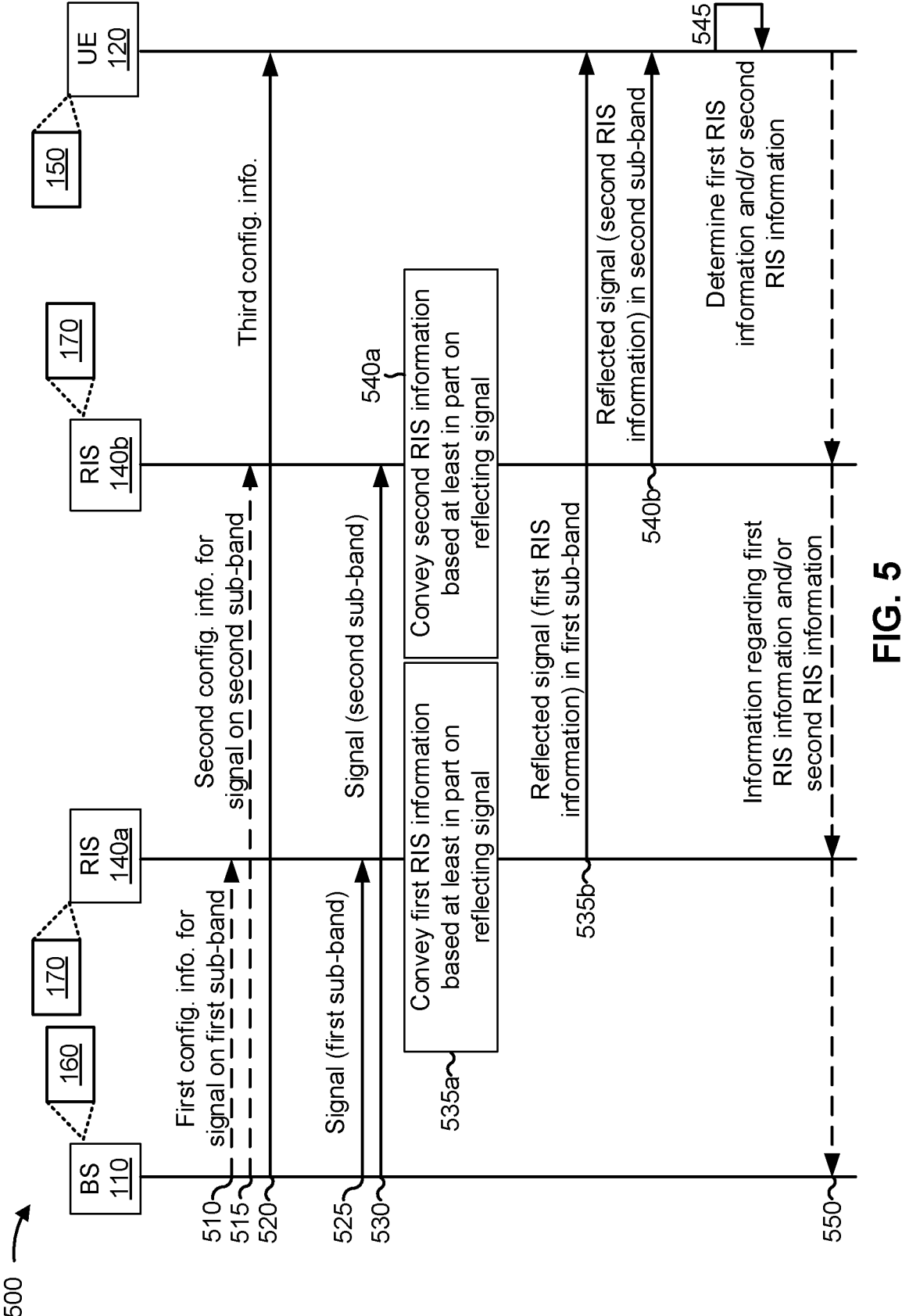
FIG. 5 is a diagram illustrating an example associated with passive communication via multiple reflective surfaces, in accordance with the present disclosure.

FIG. 5 is a diagram illustrating an example 500 of passive communication via multiple reflective surfaces, in accordance with the present disclosure. As shown in FIG. 5, a UE (e.g., UE 120) may communicate (e.g., transmit an uplink transmission and/or receive a downlink transmission) with a base station (e.g., base station 110) via a first RIS (e.g., RIS 140a) and a second RIS (e.g., RIS 140b). The UE, the base station, the first RIS, and the second RIS may be part of a wireless network (e.g., wireless network 100). In some aspects, the first RIS and the second RIS are associated with different component carriers.

As shown by reference number 510, the base station may transmit, and the first RIS may receive, first configuration information. In some aspects, the first RIS may receive first configuration information from another device (e.g., from another base station, RIS, or UE). In some aspects, the first RIS may receive the first configuration information via RRC signaling and/or medium access control (MAC) signaling (e.g., MAC control elements (MAC CEs)). In some aspects, the first configuration information may include an indication of one or more configuration parameters (e.g., already known to the first RIS) for selection by the first RIS and/or explicit configuration information for the first RIS to use to configure the first RIS.

In some aspects, the first configuration information may be for a set of reflective elements (e.g., reflective element 330) of the first RIS. The first configuration information may indicate a set of reflective matrices associated with indicating RIS information to the UE. In some aspects, the first configuration information may indicate the UE (e.g., the UE to which first RIS information for the first RIS is to be conveyed, or a beam corresponding to the UE to which the first RIS information is to be conveyed), and the first configuration information may be associated with reflecting a signal in a first sub-band, of multiple sub-bands, of a base station.

In some aspects, the first configuration information may indicate a time associated with a starting symbol of the signal, a number of reference signals conveyed by the signal, or a gap between one or more reference signals. For example, the first configuration information may indicate a manner in which the first RIS is to communicate feedback (e.g., ACK/NACK feedback) to the UE (e.g., as described herein). In some aspects, the gap is a first gap, and the first RIS information indicates whether a controller of the first RIS can reconfigure the set of reflective elements in a shorter time period than the first gap, and the first RIS may receive other configuration information indicating a second gap that is shorter than the first gap. For example, the base station may use an initial length of gap between the reference signals. In some aspects, the initial length may be a conservative length, such that any RIS can switch between reflective matrixes in accordance with the initial length of gap. A RIS (e.g., the first RIS or the second RIS) may indicate, to the base station via RIS information, that the RIS can support a shorter length of gap than the initial length of gap (such as based at least in part on the RIS being capable of reconfiguring itself faster than the initial length of gap). The base station may accordingly provide other configuration information indicating a shorter gap.

In some aspects, the first configuration information may indicate the first RIS is to freeze a reflective matrix of the set of reflective elements during a time interval. In this situation, the time interval may be associated with a second RIS (e.g., RIS 140b) signaling second RIS information associated with the base station. For example, the base station may provide a freeze notification (as part of the first configuration information or separately from the first configuration information). The freeze notification may indicate that a RIS should not change reflective matrix during a specified time interval. This may be helpful, for example, when there are multiple RISs near each other and the base station is not able to distinguish the multiple RISs via different beams.

The first RIS may configure the first RIS for communicating with the base station and/or the UE. In some aspects, the first RIS may configure the first RIS based at least in part on the first configuration information. For example, the first RIS may configure the set of reflective elements to indicate the first RIS information via the signal as reflected by the first RIS. In some aspects, the first RIS may be configured to perform one or more operations described herein.

As shown by reference number 515, the base station may transmit, and the second RIS may receive, second configuration information. In some aspects, the second RIS may receive second configuration information from another device (e.g., from another base station, RIS, or UE). In some aspects, the second RIS may receive the second configuration information via RRC signaling and/or MAC signaling (e.g., MAC CEs). In some aspects, the second configuration information may include an indication of one or more configuration parameters (e.g., already known to the second RIS) for selection by the second RIS and/or explicit configuration information for the second RIS to use to configure the second RIS. For example, the second configuration information may indicate the UE (e.g., the UE to which first RIS information for the first RIS is to be conveyed, or a beam corresponding to the UE to which the first RIS information is to be conveyed).

As mentioned above, the base station may indicate an intended UE (or beam) to which a RIS is to direct RIS information. For instance, if each RIS is serving multiple UEs, it might be beneficial, in terms of overhead, if a single UE receives the RIS information for each RIS and reports the RIS information to the base station. Alternatively, a UE may already be scheduled to receive RIS information from multiple RISs, and may not be able to handle more RISs. In this case, the base station may configure the RIS to use a different beam (intended for a different UE) to convey RIS information.

In some aspects, the second configuration information may include configuration information similar to any aspects described herein with respect to the first configuration information. In some aspects, the second configuration information may be associated with reflecting the signal (e.g., the same signal reflected by the first RIS) in a second sub-band, of the multiple sub-bands, of a base station. For example, the second sub-band may be different from the first sub-band, such that the signal, when reflected by the second RIS, is reflected in a sub-band that is different from the first sub-band. In some aspects, the second configuration information may indicate that the second RIS is to reflect the signal in a same or different manner than the first RIS, e.g., in a manner designed to convey the second RIS information (e.g., ACK/NACK feedback) in the same manner, or a different manner, the first RIS uses to convey the first RIS information.

The second RIS may configure the second RIS for communicating with the base station and/or the UE. In some aspects, the second RIS may configure the second RIS based at least in part on the second configuration information. For example, the second RIS may configure the set of reflective elements to indicate the second RIS information via the signal as reflected by the second RIS. In some aspects, the second RIS may be configured to perform one or more operations described herein.

As shown by reference number 520, the base station may transmit, and the UE may receive, third configuration information. In some aspects, the UE may receive third configuration information from another device (e.g., from another base station, a RIS, or another UE). In some aspects, the UE may receive the third configuration information via RRC signaling, MAC signaling (e.g., MAC CEs), and/or downlink control information (DCI). In some aspects, the third configuration information may include an indication of one or more configuration parameters (e.g., already known to the UE) for selection by the UE and/or explicit configuration information for the UE to use to configure the UE.

In some aspects, the third configuration information may indicate that the UE is to receive, from a base station and via multiple RISs, RIS information from the multiple RISs and provide feedback regarding the RIS information to the base station. For example, the UE may be configured to receive the third configuration information identifying a set of sub-bands for receiving a signal via a set of RISs (e.g., the first RIS and the second RIS). Based at least in part on receiving the signal via the first RIS and the second RIS, the UE is configured to transmit, to the base station, RIS information indicating feedback for the first RIS and/or the second RIS. In some aspects, the third configuration information may indicate that the base station may transmit, to the first RIS, the signal in the first sub-band and transmit, to the second RIS, the signal in the second sub-band.

In some aspects, the third configuration information may indicate a mapping between sub-band indices and the set of RISs. For example, the mapping may indicate that the first sub-band is associated with the first RIS and the second sub-band is associated with the second RIS. The mapping may be used, for example, by the UE to determine from which RIS a signal is received.

In some aspects, the third configuration information may indicate a maximum number of RISs for which the UE is to transmit respective RIS information. For example, to limit overhead involved in reporting RIS information, the UE may only be configured to transmit RIS information for a limited number of RISs and/or configured to report with a limited frequency. For example, the UE may be able to detect four RISs but be configured to only send reports for two of the four RISs.

In some aspects, the third configuration information may indicate a time associated with a starting symbol of the signal, a number of reference signals conveyed by the signal, or a gap between one or more reference signals. For example, the first configuration information may indicate a manner in which the UE is to receive feedback (e.g., ACK/NACK feedback) from the first RIS and/or the second RIS (e.g., as described herein).

The UE may configure the UE for communicating with the base station, the first RIS, and/or the second RIS. In some aspects, the UE may configure the UE based at least in part on the third configuration information. In some aspects, the UE may be configured to perform one or more operations described herein.

As shown by reference number 525, the base station may transmit, and the first RIS may receive (e.g., passively), the signal in the first sub-band. In some aspects, the base station may use beamforming to transmit the signal in a first direction associated with the first RIS. Based at least in part on the first configuration information, the base station may transmit the signal to the first RIS in a manner designed to have one or more reflective elements of the first RIS reflect the signal to the UE.

As shown by reference number 530, the base station may transmit, and the second RIS may receive (e.g., passively), the signal in the second sub-band. In some aspects, the base station may use beamforming to transmit the signal in a second direction associated with the second RIS, and the second direction is different from the first direction. For example, the base station may use a first precoder associated with the first sub-band and the first RIS, and a second precoder associated with the second sub-band and the second RIS, to transmit the signal. Based at least in part on the second configuration information, the base station may transmit the signal to the second RIS in a manner designed to have one or more reflective elements of the second RIS reflect the signal to the UE.

As shown by reference numbers 535a and 535b, the first RIS may indicate, to the UE, first RIS information via the signal, reflected by the first RIS and received by the UE, in the first sub-band. In some aspects, the first RIS may modify the signal when reflecting the signal, as described herein, to convey first RIS information to the UE. For example, the first RIS may use phase key shifting, beam width modification, antenna panel targeting, reference signal symbol modification, and/or the like, to convey the first RIS information to the UE. The first RIS information may indicate, for example, feedback (e.g., an ACK/NACK) for a prior communication between the first RIS and the base station. As another example, the first RIS information may indicate a channel condition at the first RIS. As yet another example, the first RIS information may indicate a length of gap between reference signals that the first RIS supports, such as associated with a switching time of the first RIS.

As shown by reference numbers 540a and 540b, the second RIS may indicate, to the UE, second RIS information via the signal, reflected by the second RIS and received by the UE, in the second sub-band. In some aspects, the second RIS may modify the signal when reflecting the signal, as described herein, to convey second RIS information to the UE. For example, the second RIS may use phase key shifting, beam width modification, antenna panel targeting, reference signal symbol modification, and/or the like, to convey the second RIS information to the UE. In some aspects, the manner in which the second RIS provides the second RIS information to the UE may be the same as or different from the manner in which the first RIS provides the first RIS information to the UE. The second RIS information may indicate, for example, feedback (e.g., an ACK/NACK) for a prior communication between the second RIS and the base station. As another example, the second RIS information may indicate a channel condition at the second RIS. As yet another example, the second RIS information may indicate a length of gap between reference signals that the first RIS supports, such as associated with a switching time of the second RIS.

As shown by reference number 545, the UE may determine the RIS information based at least in part on the reflected signal. In some aspects, the UE may determine the RIS information based at least in part on the time associated with the starting symbol of the signal, the number of reference signals, or a gap between one or more reference signals. For example, the UE may use one or more of the techniques described herein (e.g., and indicated in the configuration information), such as phase key shifting, beam width modification, antenna panel targeting, reference signal symbol modification, and/or the like, to determine the RIS information from each of the reflected signals.

In some aspects, the technique used to determine the first RIS information may be the same as or different from the technique used to determine the second RIS information. For example, the UE may detect first RIS information (e.g., an ACK or NACK) transmitted in the first sub-band, by using a phase key shifting technique for the signal received in the first sub-band, and the UE may detect second RIS information (e.g., an ACK or NACK), transmitted in the second sub-band, by using a beam width modification technique for the signal received in the second sub-band.

In some aspects, the UE may identify the first RIS based at least in part on a mapping indicating that the first sub-band is mapped to the first RIS, and identify the second RIS based at least in part on the mapping indicating that the second sub-band is mapped to the second RIS. For example, the UE may be configured to use information mapping sub-bands to RIS identifiers, to enable the UE to identify from which RIS a signal is received.

As shown by reference number 550, the UE may transmit, and the base station may receive, the RIS information. In some aspects, the RIS information includes the first RIS information and/or the second RIS information. For example, the RIS information may include information indicating feedback (e.g., ACK/NACK feedback) associated with one or more prior communications between the base station and the first RIS and/or the second RIS. In some aspects, the first RIS information may include an acknowledgement indicating that the UE received the signal via the first RIS, or a negative acknowledgment indicating that the UE did not receive the signal via the first RIS. Additionally, or alternatively, the second RIS information may include an acknowledgement indicating that the UE received the signal via the second RIS, or a negative acknowledgment indicating that the UE did not receive the signal via the second RIS. In some aspects, the RIS information may include channel information regarding a channel between at least one of the RISs and the UE. In some aspects, the RIS information may include information indicating that the RIS is present in a network, which may facilitate, for example, identifying RISs included in the network.

In some aspects, transmitting the RIS information may include transmitting the RIS information via uplink control information (UCI). In some aspects, transmitting the RIS information may include multiplexing the RIS information with UCI. For example, the UE may transmit the RIS information by multiplexing the RIS information with a hybrid automatic repeat request (HARQ) acknowledgement and/or a channel state information (CSI) report. In some aspects, at least a portion of the RIS information may be transmitted via physical uplink control channel (PUCCH) communication(s) and/or multiplexing at least a portion of the RIS information via PUCCH communication(s). In some aspects, at least a portion of the RIS information may be transmitted via physical uplink shared channel (PUSCH) communication(s) and/or multiplexing at least a portion of the RIS information via PUSCH communication(s).

In some aspects, transmitting the RIS information may include transmitting data identifying the first RIS and/or the second RIS. For example, the RIS information may include a RIS identifier for the first RIS and/or the second RIS (e.g., along with RIS information indicating the feedback). The UE may determine the RIS identifier, for example, based at least in part on data mapping the sub-band via which the RIS information was received and data identifying the corresponding RIS.

In some aspects, the UE may transmit, and the base station may receive, the RIS information in a sequence of multiple k-bit segments, where each k-bit segment, of the multiple k-bit segments, corresponds to a RIS of the set of RISs (e.g., the first RIS or the second RIS, in example 500).

In some aspects, the RIS information may be associated with a measure of priority. The measure of priority may indicate RIS information priority relative to other data to be transmitted by the UE. For example, the measure of priority may indicate RIS information priority relative to a HARQ priority (e.g., for HARQ feedback) and/or a CSI priority (e.g., for CSI reporting). In some aspects, the RIS information may be transmitted based at least in part on the measure of priority. For example, the RIS information may be included in available resources of HARQ feedback transmitted by the UE, available resources of CSI reports transmitted by the UE, and other available uplink shared channel resources of the UE. In the foregoing example, the RIS information is prioritized for inclusion in the HARQ feedback first, the CSI report(s) second, and other uplink shared channel resources third, though other prioritization schemes may be used to transmit the RIS information.

In some aspects, the UE may be configured to report the RIS information in an aperiodic and/or periodic manner. For example, in some situations the UE may report aperiodically (e.g., based on a triggering signal transmitted by the base station and received by the UE). In some situations, the UE may report the RIS information periodically (e.g., transmitting the RIS information according to a preconfigured schedule).

In some aspects, the UE may transmit, and the first RIS and/or the second RIS may receive, feedback regarding the RIS information. For example, the UE may transmit, to the first RIS, an acknowledgment indicating that the first RIS information was received by the UE and reported to the base station. The UE may transmit, to the second RIS, an acknowledgement indicating that the second RIS information was received by the UE and reported to the base station.

In some aspects, the UE may transmit, and the first RIS and/or the second RIS may receive, feedback including a negative acknowledgement indicating that the UE did not receive the RIS information. In this situation, the first RIS and/or second RIS may configure the reflective elements to repeat the first and/or second RIS information via the signal as reflected by the first and/or second RIS. In some aspects, the signal reflected to the UE may be reflected via a first beam, and based on feedback indicating that the RIS information is not received by the UE, a RIS may configure the set of reflective elements to repeat the RIS information via a second beam that is different from the first beam. This may enable, for example, a RIS to re-attempt transmission of RIS information multiple times via multiple different beams.

In some aspects, the base station may receive, from another UE, other RIS information regarding the first RIS or the second RIS. For example, in some situations, the base station may configure multiple UEs to provide RIS information.

As indicated above, FIG. 5 is provided as an example. Other examples may differ from what is described with regard to FIG. 5. For example, while FIG. 5 is described with respect to communications involving two RISs, methods described herein for providing feedback for two RISs may also be used for one RIS or more than two RISs.

In this way, a base station can determine RIS information regarding multiple RISs using overlapped time resources, which reduces overhead and latency associated with determining RIS information. Furthermore, the determination of the RIS information regarding the multiple RISs may improve the accuracy of channel estimation and ACK/NACK feedback regarding the configuration and operation of the RISs.

FIG. 6 is a diagram illustrating an example process 600 performed, for example, by a UE, in accordance with the present disclosure. Example process 600 is an example where the UE (e.g., UE 120) performs operations associated with passive communication via multiple reflective surfaces.

As shown in FIG. 6, in some aspects, process 600 may include receiving configuration information identifying a set of sub-bands for receiving, via a set of reconfigurable reflective surfaces, a signal (block 610). For example, the UE (e.g., using communication manager 150 and/or reception component 802, depicted in FIG. 8) may receive configuration information identifying a set of sub-bands for receiving, via a set of reconfigurable reflective surfaces, a signal, as described above.

As further shown in FIG. 6, in some aspects, process 600 may include receiving, via a first reconfigurable reflective surface of the set of reconfigurable reflective surfaces, the signal in a first sub-band of the set of sub-bands (block 620). For example, the UE (e.g., using communication manager 150 and/or reception component 802, depicted in FIG. 8) may receive, via a first reconfigurable reflective surface of the set of reconfigurable reflective surfaces, the signal in a first sub-band of the set of sub-bands, as described above.

As further shown in FIG. 6, in some aspects, process 600 may include receiving, via a second reconfigurable reflective surface of the set of reconfigurable reflective surfaces, the signal in a second sub-band of the set of sub-bands (block 630). For example, the UE (e.g., using communication manager 150 and/or reception component 802, depicted in FIG. 8) may receive, via a second reconfigurable reflective surface of the set of reconfigurable reflective surfaces, the signal in a second sub-band of the set of sub-bands, as described above.

As further shown in FIG. 6, in some aspects, process 600 may include transmitting, based at least in part on receiving the signal, reconfigurable reflective surface information indicating at least one of: first reconfigurable reflective surface information regarding the first reconfigurable reflective surface, or second reconfigurable reflective surface information regarding the second reconfigurable reflective surface (block 640). For example, the UE (e.g., using communication manager 150 and/or transmission component 804, depicted in FIG. 8) may transmit, based at least in part on receiving the signal, reconfigurable reflective surface information indicating at least one of: first reconfigurable reflective surface information regarding the first reconfigurable reflective surface, or second reconfigurable reflective surface information regarding the second reconfigurable reflective surface, as described above.

Process 600 may include additional aspects, such as any single aspect or any combination of aspects described below and/or in connection with one or more other processes described elsewhere herein.

In a first aspect, transmitting the reconfigurable reflective surface information comprises transmitting the reconfigurable reflective surface information via uplink control information, or multiplexing the reconfigurable reflective surface information with uplink control information.

In a second aspect, alone or in combination with the first aspect, transmitting the reconfigurable reflective surface information comprises multiplexing the reconfigurable reflective surface information with at least one of a hybrid automatic repeat request (HARQ) acknowledgement or a channel state information (CSI) report.

In a third aspect, alone or in combination with one or more of the first and second aspects, transmitting the reconfigurable reflective surface information comprises one or more of transmitting at least a portion of the reconfigurable reflective surface information via physical uplink control channel (PUCCH) communication, multiplexing at least a portion of the reconfigurable reflective surface information via PUCCH communication, transmitting at least a portion of the reconfigurable reflective surface information via physical uplink shared channel (PUSCH) communication, or multiplexing at least a portion of the reconfigurable reflective surface information via PUSCH communication.

In a fourth aspect, alone or in combination with one or more of the first through third aspects, transmitting the reconfigurable reflective surface information comprises transmitting data identifying at least one of the first reconfigurable reflective surface or the second reconfigurable reflective surface.

In a fifth aspect, alone or in combination with one or more of the first through fourth aspects, the configuration information indicates a maximum number of reconfigurable reflective surfaces for which the UE is to transmit respective reconfigurable reflective surface information.

In a sixth aspect, alone or in combination with one or more of the first through fifth aspects, the configuration information indicates a mapping between sub-band indices and the set of reconfigurable reflective surfaces.

In a seventh aspect, alone or in combination with one or more of the first through sixth aspects, process 600 includes identifying the first reconfigurable reflective surface based at least in part on the mapping indicating the first sub-band is mapped to the first reconfigurable reflective surface, and identifying the second reconfigurable reflective surface based at least in part on the mapping indicating the second sub-band is mapped to the second reconfigurable reflective surface.

In an eighth aspect, alone or in combination with one or more of the first through seventh aspects, transmitting the reconfigurable reflective surface information comprises transmitting the reconfigurable reflective surface information in a sequence of multiple k-bit segments, wherein each k-bit segment, of the multiple k-bit segments, corresponds to a reconfigurable reflective surface of the set of reconfigurable reflective surfaces.

In a ninth aspect, alone or in combination with one or more of the first through eighth aspects, the reconfigurable reflective surface information is associated with a measure of priority, and the measure of priority indicates reconfigurable reflective surface information priority relative to at least one of HARQ priority or CSI priority.

In a tenth aspect, alone or in combination with one or more of the first through ninth aspects, transmitting the reconfigurable reflective surface information comprises transmitting the reconfigurable reflective surface information based at least in part on the measure of priority.

In an eleventh aspect, alone or in combination with one or more of the first through tenth aspects, the configuration information indicates that the UE is to report the reconfigurable reflective surface information in at least one of an aperiodic or periodic manner.

In a twelfth aspect, alone or in combination with one or more of the first through eleventh aspects, the first reconfigurable reflective surface and the second reconfigurable reflective surface are associated with different component carriers.

In a thirteenth aspect, alone or in combination with one or more of the first through twelfth aspects, the configuration information indicates at least one of a time associated with a starting symbol of the signal, a number of reference signals conveyed by the signal, or a gap between one or more reference signals of the number of reference signals.

In a fourteenth aspect, alone or in combination with one or more of the first through thirteenth aspects, process 600 includes determining the reconfigurable reflective surface information based at least in part on at least one of the time associated with the starting symbol of the signal, the number of reference signals, or the gap between the one or more reference signals.

In a fifteenth aspect, alone or in combination with one or more of the first through fourteenth aspects, the first reconfigurable reflective surface information includes feedback indicating one of an acknowledgement indicating the UE received the signal via the first reconfigurable reflective surface, or a negative acknowledgment indicating that the UE did not receive the signal via the first reconfigurable reflective surface, and the second reconfigurable reflective surface information includes feedback indicating one of an acknowledgement indicating the UE received the signal via the second reconfigurable reflective surface, or a negative acknowledgment indicating that the UE did not receive the signal via the second reconfigurable reflective surface.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with the present disclosure. Example process 700 is an example where the base station (e.g., base station 110) performs operations associated with passive communication via multiple reflective surfaces.

As shown in FIG. 7, in some aspects, process 700 may include transmitting, to a UE, configuration information identifying a set of sub-bands for transmitting, via a set of reconfigurable reflective surfaces, a signal (block 710). For example, the base station (e.g., using communication manager 160 and/or transmission component 904, depicted in FIG. 9) may transmit, to a UE, configuration information identifying a set of sub-bands for transmitting, via a set of reconfigurable reflective surfaces, a signal, as described above.

As further shown in FIG. 7, in some aspects, process 700 may include transmitting, to a first reconfigurable reflective surface of the set of reconfigurable reflective surfaces, the signal in a first sub-band of the set of sub-bands (block 720). For example, the base station (e.g., using communication manager 160 and/or transmission component 904, depicted in FIG. 9) may transmit, to a first reconfigurable reflective surface of the set of reconfigurable reflective surfaces, the signal in a first sub-band of the set of sub-bands, as described above.

As further shown in FIG. 7, in some aspects, process 700 may include transmitting, to a second reconfigurable reflective surface of the set of reconfigurable reflective surfaces, the signal in a second sub-band of the set of sub-bands (block 730). For example, the base station (e.g., using communication manager 160 and/or transmission component 904, depicted in FIG. 9) may transmit, to a second reconfigurable reflective surface of the set of reconfigurable reflective surfaces, the signal in a second sub-band of the set of sub-bands, as described above.

As further shown in FIG. 7, in some aspects, process 700 may include receiving, from the UE, reconfigurable reflective surface information indicating at least one of: first reconfigurable reflective surface information regarding the first reconfigurable reflective surface, or second reconfigurable reflective surface information regarding the second reconfigurable reflective surface (block 740). For example, the base station (e.g., using communication manager 160 and/or reception component 902, depicted in FIG. 9) may receive, from the UE, reconfigurable reflective surface information indicating at least one of: first reconfigurable reflective surface information regarding the first reconfigurable reflective surface, or second reconfigurable reflective surface information regarding the second reconfigurable reflective surface, as described above.

Process 700 may include additional aspects, such as any single aspect or any combination of aspects described below and/or in connection with one or more other processes described elsewhere herein.

In a first aspect, transmitting the signal in the first sub-band comprises beam-forming the signal in a first direction, and transmitting the signal in the second sub-band comprises beam-forming the signal in a second direction that is different from the first direction.

In a second aspect, alone or in combination with the first aspect, receiving the reconfigurable reflective surface information comprises receiving the reconfigurable reflective surface information via uplink control information, or receiving the reconfigurable reflective surface information via multiplexed uplink control information.

In a third aspect, alone or in combination with one or more of the first and second aspects, receiving the reconfigurable reflective surface information comprises receiving the reconfigurable reflective surface information multiplexed with at least one of a HARQ acknowledgement or a CSI report.

In a fourth aspect, alone or in combination with one or more of the first through third aspects, receiving the reconfigurable reflective surface information comprises one or more of receiving at least a portion of the reconfigurable reflective surface information via PUCCH communication, receiving at least a portion of the reconfigurable reflective surface information multiplexed with PUCCH communication, receiving at least a portion of the reconfigurable reflective surface information via PUSCH communication, or receiving at least a portion of the reconfigurable reflective surface information multiplexed with PUSCH communication.

In a fifth aspect, alone or in combination with one or more of the first through fourth aspects, receiving the reconfigurable reflective surface information comprises receiving data identifying at least one of the first reconfigurable reflective surface or the second reconfigurable reflective surface.

In a sixth aspect, alone or in combination with one or more of the first through fifth aspects, the configuration information indicates a maximum number of reconfigurable reflective surfaces for which the UE is to transmit respective reconfigurable reflective surface information.

In a seventh aspect, alone or in combination with one or more of the first through sixth aspects, the configuration information indicates a mapping between sub-band indices and the set of reconfigurable reflective surfaces.

In an eighth aspect, alone or in combination with one or more of the first through seventh aspects, receiving the reconfigurable reflective surface information comprises receiving the reconfigurable reflective surface information in a sequence of multiple k-bit segments, wherein each k-bit segment, of the multiple k-bit segments, corresponds to a reconfigurable reflective surface of the set of reconfigurable reflective surfaces.

In a ninth aspect, alone or in combination with one or more of the first through eighth aspects, the configuration information includes information identifying a measure of priority associated with the reconfigurable reflective surface information, and the measure of priority indicates reconfigurable reflective surface information priority relative to at least one of HARQ priority or CSI priority.

In a tenth aspect, alone or in combination with one or more of the first through ninth aspects, the configuration information indicates that the UE is to report the reconfigurable reflective surface information to the base station in at least one of an aperiodic or periodic manner.

In an eleventh aspect, alone or in combination with one or more of the first through tenth aspects, the configuration information indicates that the reconfigurable reflective surface information may be determined based at least in part on at least one of a time associated with a starting symbol of the signal, a number of reference signals conveyed by the signal, or a gap between one or more reference signals of the number of reference signals.

In a twelfth aspect, alone or in combination with one or more of the first through eleventh aspects, the first reconfigurable reflective surface information includes feedback indicating one of an acknowledgement indicating that the UE received the signal via the first reconfigurable reflective surface, or a negative acknowledgment indicating that the UE did not receive the signal via the first reconfigurable reflective surface, and the second reconfigurable reflective surface information includes feedback indicating one of an acknowledgement indicating that the UE received the signal via the second reconfigurable reflective surface, or a negative acknowledgment indicating that the UE did not receive the signal via the second reconfigurable reflective surface.

In a thirteenth aspect, alone or in combination with one or more of the first through twelfth aspects, process 700 includes receiving, from another UE, other reconfigurable reflective surface information regarding the first reconfigurable reflective surface or the second reconfigurable reflective surface.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
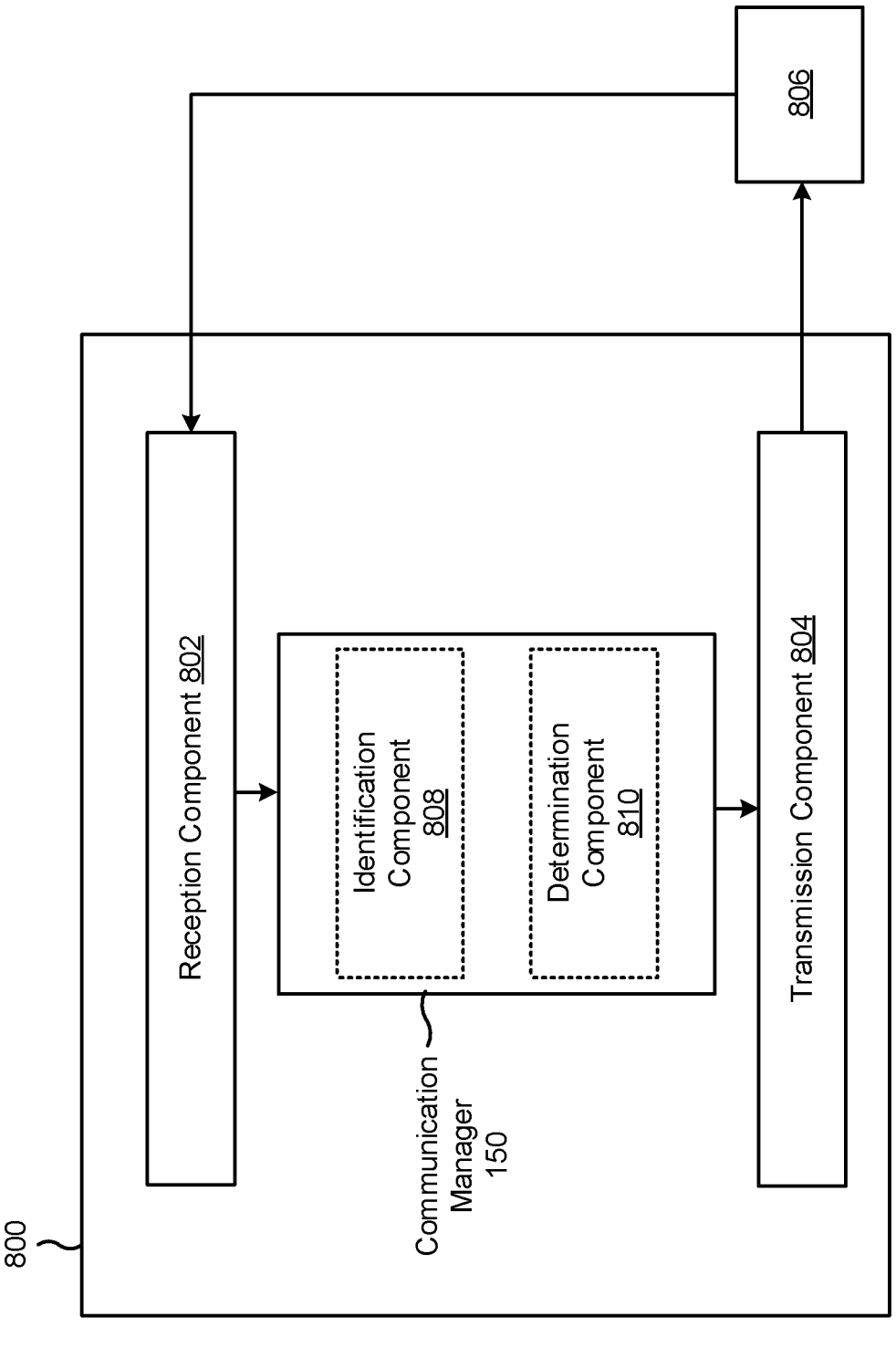
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include one or more of an identification component 808 or a determination component 810, among other examples.

In some aspects, the apparatus 800 may be configured to perform one or more operations described herein in connection with FIGS. 4-7. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive configuration information identifying a set of sub-bands for receiving, via a set of reconfigurable reflective surfaces, a signal. The reception component 802 may receive, via a first reconfigurable reflective surface of the set of reconfigurable reflective surfaces, the signal in a first sub-band of the set of sub-bands. The reception component 802 may receive, via a second reconfigurable reflective surface of the set of reconfigurable reflective surfaces, the signal in a second sub-band of the set of sub-bands. The transmission component 804 may transmit, based at least in part on receiving the signal, reconfigurable reflective surface information indicating at least one of first reconfigurable reflective surface information regarding the first reconfigurable reflective surface, or second reconfigurable reflective surface information regarding the second reconfigurable reflective surface.

The identification component 808 may identify the first reconfigurable reflective surface based at least in part on the mapping indicating the first sub-band is mapped to the first reconfigurable reflective surface.

The identification component 808 may identify the second reconfigurable reflective surface based at least in part on the mapping indicating the second sub-band is mapped to the second reconfigurable reflective surface.

The determination component 810 may determine the reconfigurable reflective surface information based at least in part on at least one of the time associated with the starting symbol of the signal, the number of reference signals, or the gap between the one or more reference signals.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
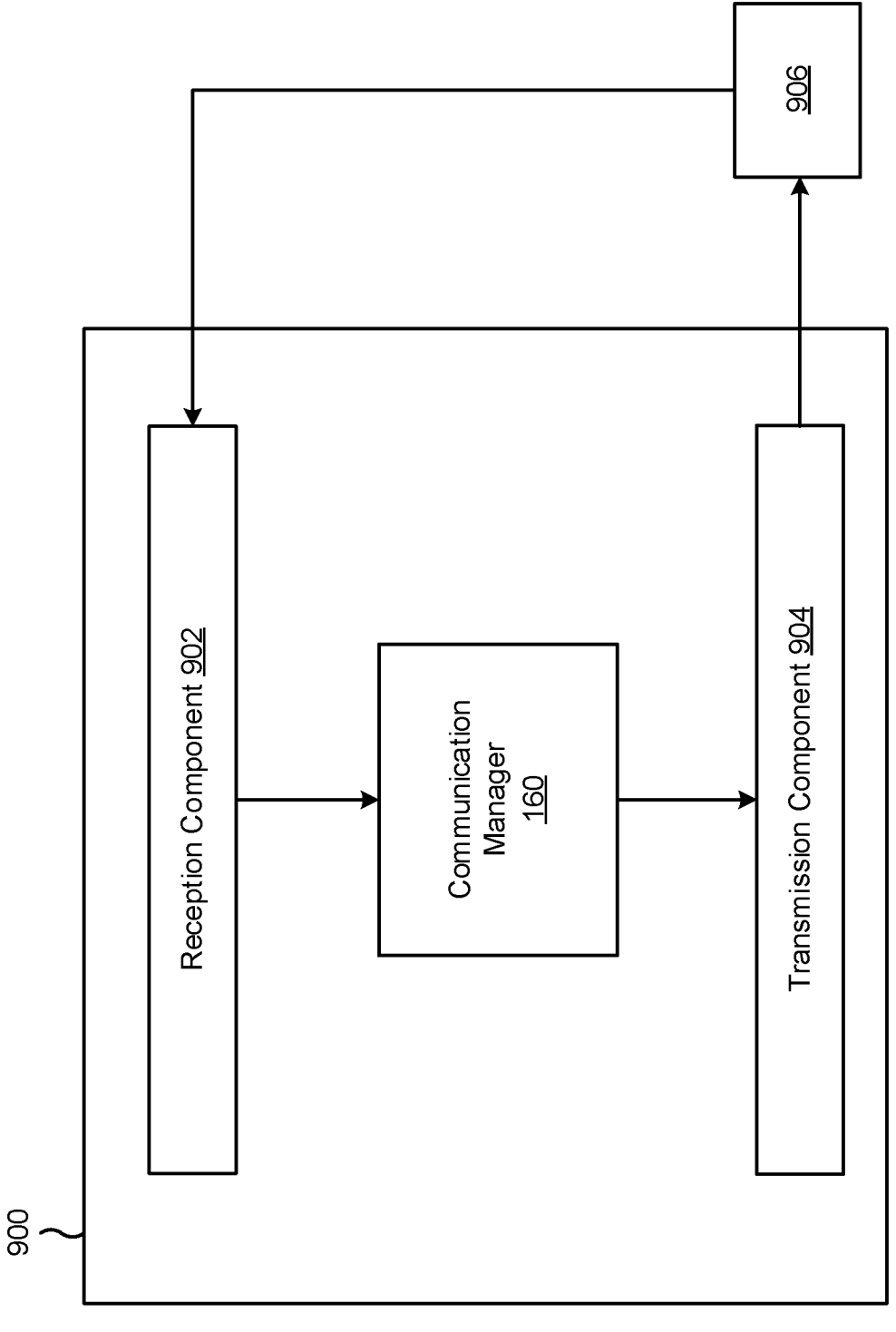

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 160, which may include one or more other components.

In some aspects, the apparatus 900 may be configured to perform one or more operations described herein in connection with FIGS. 4-7. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a user equipment (UE), configuration information identifying a set of sub-bands for transmitting, via a set of reconfigurable reflective surfaces, a signal. The transmission component 904 may transmit, to a first reconfigurable reflective surface of the set of reconfigurable reflective surfaces, the signal in a first sub-band of the set of sub-bands. The transmission component 904 may transmit, to a second reconfigurable reflective surface of the set of reconfigurable reflective surfaces, the signal in a second sub-band of the set of sub-bands. The reception component 902 may receive, from the UE, reconfigurable reflective surface information indicating at least one of first reconfigurable reflective surface information regarding the first reconfigurable reflective surface, or second reconfigurable reflective surface information regarding the second reconfigurable reflective surface. The reception component 902 may receive, from another UE, other reconfigurable reflective surface information regarding the first reconfigurable reflective surface or the second reconfigurable reflective surface.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving configuration information identifying a set of sub-bands for receiving, via a set of reconfigurable reflective surfaces, a signal; receiving, via a first reconfigurable reflective surface of the set of reconfigurable reflective surfaces, the signal in a first sub-band of the set of sub-bands; receiving, via a second reconfigurable reflective surface of the set of reconfigurable reflective surfaces, the signal in a second sub-band of the set of sub-bands; and transmitting, based at least in part on receiving the signal, reconfigurable reflective surface information indicating at least one of: first reconfigurable reflective surface information regarding the first reconfigurable reflective surface, or second reconfigurable reflective surface information regarding the second reconfigurable reflective surface.

Aspect 2: The method of Aspect 1, wherein transmitting the reconfigurable reflective surface information comprises: transmitting the reconfigurable reflective surface information via uplink control information, or multiplexing the reconfigurable reflective surface information with uplink control information.

Aspect 3: The method of Aspect 1 or 2, wherein transmitting the reconfigurable reflective surface information comprises: multiplexing the reconfigurable reflective surface information with at least one of a hybrid automatic repeat request (HARQ) acknowledgement or channel state information (CSI) report.

Aspect 4: The method of any of Aspects 1-3, wherein transmitting the reconfigurable reflective surface information comprises one or more of: transmitting at least a portion of the reconfigurable reflective surface information via physical uplink control channel (PUCCH) communication, multiplexing at least a portion of the reconfigurable reflective surface information via PUCCH communication, transmitting at least a portion of the reconfigurable reflective surface information via physical uplink shared channel (PUSCH) communication, or multiplexing at least a portion of the reconfigurable reflective surface information via PUSCH communication.

Aspect 5: The method of any of Aspects 1-4, wherein transmitting the reconfigurable reflective surface information comprises: transmitting data identifying at least one of the first reconfigurable reflective surface or the second reconfigurable reflective surface.

Aspect 6: The method of any of Aspects 1-5, wherein the configuration information indicates a maximum number of reconfigurable reflective surfaces for which the UE is to transmit respective reconfigurable reflective surface information.

Aspect 7: The method of any of Aspects 1-6, wherein the configuration information indicates a mapping between sub-band indices and the set of reconfigurable reflective surfaces.

Aspect 8: The method of Aspect 7, further comprising: identifying the first reconfigurable reflective surface based at least in part on the mapping indicating the first sub-band is mapped to the first reconfigurable reflective surface; and identifying the second reconfigurable reflective surface based at least in part on the mapping indicating the second sub-band is mapped to the second reconfigurable reflective surface.

Aspect 9: The method of any of Aspects 1-8, wherein transmitting the reconfigurable reflective surface information comprises: transmitting the reconfigurable reflective surface information in a sequence of multiple k-bit segments, wherein each k-bit segment, of the multiple k-bit segments, corresponds to a reconfigurable reflective surface of the set of reconfigurable reflective surfaces.

Aspect 10: The method of any of Aspects 1-9, wherein the reconfigurable reflective surface information is associated with a measure of priority; and the measure of priority indicates reconfigurable reflective surface information priority relative to at least one of hybrid automatic repeat request (HARQ) priority or channel state information (CSI) priority.

Aspect 11: The method of Aspect 10, wherein transmitting the reconfigurable reflective surface information comprises: transmitting the reconfigurable reflective surface information based at least in part on the measure of priority.

Aspect 12: The method of any of Aspects 1-11, wherein the configuration information indicates that the UE is to report the reconfigurable reflective surface information in at least one of an aperiodic or periodic manner.

Aspect 13: The method of any of Aspects 1-12, wherein the first reconfigurable reflective surface and the second reconfigurable reflective surface are associated with different component carriers.

Aspect 14: The method of any of Aspects 1-13, wherein the configuration information indicates at least one of: a time associated with a starting symbol of the signal, a number of reference signals conveyed by the signal, or a gap between one or more reference signals of the number of reference signals.

Aspect 15: The method of Aspect 14, further comprising: determining the reconfigurable reflective surface information based at least in part on at least one of: the time associated with the starting symbol of the signal, the number of reference signals, or the gap between the one or more reference signals.

Aspect 16: The method of any of Aspects 1-15, wherein the first reconfigurable reflective surface information includes feedback indicating one of: an acknowledgement indicating the UE received the signal via the first reconfigurable reflective surface, or a negative acknowledgment indicating that the UE did not receive the signal via the first reconfigurable reflective surface; and the second reconfigurable reflective surface information includes feedback indicating one of: an acknowledgement indicating the UE received the signal via the second reconfigurable reflective surface, or a negative acknowledgment indicating that the UE did not receive the signal via the second reconfigurable reflective surface.

Aspect 17: A method of wireless communication performed by a base station, comprising: transmitting, to a user equipment (UE), configuration information identifying a set of sub-bands for transmitting, via a set of reconfigurable reflective surfaces, a signal; transmitting, to a first reconfigurable reflective surface of the set of reconfigurable reflective surfaces, the signal in a first sub-band of the set of sub-bands; transmitting, to a second reconfigurable reflective surface of the set of reconfigurable reflective surfaces, the signal in a second sub-band of the set of sub-bands; and receiving, from the UE, reconfigurable reflective surface information indicating at least one of: first reconfigurable reflective surface information regarding the first reconfigurable reflective surface, or second reconfigurable reflective surface information regarding the second reconfigurable reflective surface.

Aspect 18: The method of Aspect 17, wherein the transmitting the signal in the first sub-band comprises: beamforming the signal in a first direction; and wherein transmitting the signal in the second sub-band comprises: beamforming the signal in a second direction that is different from the first direction.

Aspect 19: The method of Aspect 17 or 18, wherein receiving the reconfigurable reflective surface information comprises: receiving the reconfigurable reflective surface information via uplink control information, or receiving the reconfigurable reflective surface information via multiplexed uplink control information.

Aspect 20: The method of any of Aspects 17-19, wherein receiving the reconfigurable reflective surface information comprises: receiving, the reconfigurable reflective surface information multiplexed with at least one of a hybrid automatic repeat request (HARQ) acknowledgement or channel state information (CSI) report.

Aspect 21: The method of any of Aspects 17-20, wherein receiving the reconfigurable reflective surface information comprises one or more of: receiving at least a portion of the reconfigurable reflective surface information via physical uplink control channel (PUCCH) communication, receiving at least a portion of the reconfigurable reflective surface information multiplexed with PUCCH communication, receiving at least a portion of the reconfigurable reflective surface information via physical uplink shared channel (PUSCH) communication, or receiving at least a portion of the reconfigurable reflective surface information multiplexed with PUSCH communication.

Aspect 22: The method of any of Aspects 17-21, wherein receiving the reconfigurable reflective surface information comprises: Receiving data identifying at least one of the first reconfigurable reflective surface or the second reconfigurable reflective surface.

Aspect 23: The method of any of Aspects 17-22, wherein the configuration information indicates a maximum number of reconfigurable reflective surfaces for which the UE is to transmit respective reconfigurable reflective surface information.

Aspect 24: The method of any of Aspects 17-23, wherein the configuration information indicates a mapping between sub-band indices and the set of reconfigurable reflective surfaces.

Aspect 25: The method of any of Aspects 17-24, wherein receiving the reconfigurable reflective surface information comprises: receiving the reconfigurable reflective surface information in a sequence of multiple k-bit segments, wherein each k-bit segment, of the multiple k-bit segments, corresponds to a reconfigurable reflective surface of the set of reconfigurable reflective surfaces.

Aspect 26: The method of any of Aspects 17-25, wherein the configuration information includes information identifying a measure of priority associated with the reconfigurable reflective surface information; and the measure of priority indicates reconfigurable reflective surface information priority relative to at least one of hybrid automatic repeat request (HARQ) priority or channel state information (CSI) priority.

Aspect 27: The method of any of Aspects 17-26, wherein the configuration information indicates that the UE is to report the reconfigurable reflective surface information to the base station in at least one of an aperiodic or periodic manner.

Aspect 28: The method of any of Aspects 17-27, wherein the configuration information indicates that the reconfigurable reflective surface information may be determined based at least in part on at least one of: a time associated with a starting symbol of the signal, a number of reference signals conveyed by the signal, or a gap between one or more reference signals of the number of reference signals.

Aspect 29: The method of any of Aspects 17-28, wherein the first reconfigurable reflective surface information includes feedback indicating one of: an acknowledgement indicating the UE received the signal via the first reconfigurable reflective surface, or a negative acknowledgment indicating that the UE did not receive the signal via the first reconfigurable reflective surface; and the second reconfigurable reflective surface information includes feedback indicating one of: an acknowledgement indicating the UE received the signal via the second reconfigurable reflective surface, or a negative acknowledgment indicating that the UE did not receive the signal via the second reconfigurable reflective surface.

Aspect 30: The method of any of Aspects 17-29, further comprising: receiving, from another UE, other reconfigurable reflective surface information regarding the first reconfigurable reflective surface or the second reconfigurable reflective surface.

Aspect 31: An apparatus for wireless communication at a device, comprising a processor; memory coupled with the processor; and instructions stored in the memory and executable by the processor to cause the apparatus to perform the method of one or more of Aspects 1-16.

Aspect 32: An apparatus for wireless communication at a device, comprising a processor; memory coupled with the processor; and instructions stored in the memory and executable by the processor to cause the apparatus to perform the method of one or more of Aspects 17-30.

Aspect 33: A device for wireless communication, comprising a memory and one or more processors coupled to the memory, the one or more processors configured to perform the method of one or more of Aspects 1-16.

Aspect 34: A device for wireless communication, comprising a memory and one or more processors coupled to the memory, the one or more processors configured to perform the method of one or more of Aspects 17-30.

Aspect 35: An apparatus for wireless communication, comprising at least one means for performing the method of one or more of Aspects 1-16.

Aspect 36: An apparatus for wireless communication, comprising at least one means for performing the method of one or more of Aspects 17-30.

Aspect 37: A non-transitory computer-readable medium storing code for wireless communication, the code comprising instructions executable by a processor to perform the method of one or more of Aspects 1-16.

Aspect 38: A non-transitory computer-readable medium storing code for wireless communication, the code comprising instructions executable by a processor to perform the method of one or more of Aspects 17-30.

Aspect 39: A non-transitory computer-readable medium storing a set of instructions for wireless communication, the set of instructions comprising one or more instructions that, when executed by one or more processors of a device, cause the device to perform the method of one or more of Aspects 1-16.

Aspect 40: A non-transitory computer-readable medium storing a set of instructions for wireless communication, the set of instructions comprising one or more instructions that, when executed by one or more processors of a device, cause the device to perform the method of one or more of Aspects 17-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive configuration information identifying a set of sub-bands for receiving, via a set of reconfigurable reflective surfaces, a signal;

receive, via a first reconfigurable reflective surface of the set of reconfigurable reflective surfaces, the signal in a first sub-band of the set of sub-bands;

receive, via a second reconfigurable reflective surface of the set of reconfigurable reflective surfaces, the signal in a second sub-band of the set of sub-bands; and transmit, based at least in part on receiving the signal, reconfigurable reflective surface information indicating at least one of:

first reconfigurable reflective surface information regarding the first reconfigurable reflective surface, or second reconfigurable reflective surface information regarding the second reconfigurable reflective surface.

2. The UE of claim 1, wherein the one or more processors, to transmit the reconfigurable reflective surface information, are configured to:

transmit the reconfigurable reflective surface information via uplink control information, or multiplex the reconfigurable reflective surface information with uplink control information.

3. The UE of claim 1, wherein the one or more processors, to transmit the reconfigurable reflective surface information, are configured to:

multiplex the reconfigurable reflective surface information with at least one of a hybrid automatic repeat request (HARQ) acknowledgement or channel state information (CSI) report.

4. The UE of claim 1, wherein the one or more processors, to transmit the reconfigurable reflective surface information, are configured to:

transmit at least a portion of the reconfigurable reflective surface information via physical uplink control channel (PUCCH) communication, multiplex at least a portion of the reconfigurable reflective surface information via PUCCH communication, transmit at least a portion of the reconfigurable reflective surface information via physical uplink shared channel (PUSCH) communication, or multiplex at least a portion of the reconfigurable reflective surface information via PUSCH communication.

5. The UE of claim 1, wherein the one or more processors, to transmit the reconfigurable reflective surface information, are configured to:

transmit data identifying at least one of the first reconfigurable reflective surface or the second reconfigurable reflective surface.

6. The UE of claim 1, wherein the configuration information indicates a maximum number of reconfigurable reflective surfaces for which the UE is to transmit respective reconfigurable reflective surface information.

7. The UE of claim 1, wherein the configuration information indicates a mapping between sub-band indices and the set of reconfigurable reflective surfaces.

8. The UE of claim 7, wherein the one or more processors are further configured to:

identify the first reconfigurable reflective surface based at least in part on the mapping indicating the first sub-band is mapped to the first reconfigurable reflective surface; and identify the second reconfigurable reflective surface based at least in part on the mapping indicating the second sub-band is mapped to the second reconfigurable reflective surface.

9. The UE of claim 1, wherein the one or more processors, to transmit the reconfigurable reflective surface information, are configured to:

transmit the reconfigurable reflective surface information in a sequence of multiple k-bit segments, wherein each k-bit segment, of the multiple k-bit segments, corresponds to a reconfigurable reflective surface of the set of reconfigurable reflective surfaces.

10. The UE of claim 1, wherein the reconfigurable reflective surface information is associated with a measure of priority; and the measure of priority indicates reconfigurable reflective surface information priority relative to at least one of hybrid automatic repeat request (HARQ) priority or channel state information (CSI) priority.

11. The UE of claim 10, wherein the one or more processors, to transmit the reconfigurable reflective surface information, are configured to:

transmit the reconfigurable reflective surface information based at least in part on the measure of priority.

12. The UE of claim 1, wherein the configuration information indicates that the UE is to report the reconfigurable reflective surface information in at least one of an aperiodic or periodic manner.

13. The UE of claim 1, wherein the first reconfigurable reflective surface and the second reconfigurable reflective surface are associated with different component carriers.

14. The UE of claim 1, wherein the configuration information indicates at least one of:

a time associated with a starting symbol of the signal, a number of reference signals conveyed by the signal, or a gap between one or more reference signals of the number of reference signals.

15. The UE of claim 14, wherein the one or more processors are further configured to:

determine the reconfigurable reflective surface information based at least in part on at least one of:

the time associated with the starting symbol of the signal, the number of reference signals, or the gap between the one or more reference signals.

16. The UE of claim 1, wherein the first reconfigurable reflective surface information includes feedback indicating one of:

an acknowledgement indicating the UE received the signal via the first reconfigurable reflective surface, or a negative acknowledgment indicating that the UE did not receive the signal via the first reconfigurable reflective surface; and the second reconfigurable reflective surface information includes feedback indicating one of:

an acknowledgement indicating the UE received the signal via the second reconfigurable reflective surface, or a negative acknowledgment indicating that the UE did not receive the signal via the second reconfigurable reflective surface.

17. A base station for wireless communication, comprising:

a memory; and one or more processors, coupled to the memory, configured to:

transmit, to a user equipment (UE), configuration information identifying a set of sub-bands for transmitting, via a set of reconfigurable reflective surfaces, a signal;

transmit, to a first reconfigurable reflective surface of the set of reconfigurable reflective surfaces, the signal in a first sub-band of the set of sub-bands;

transmit, to a second reconfigurable reflective surface of the set of reconfigurable reflective surfaces, the signal in a second sub-band of the set of sub-bands; and receive, from the UE, reconfigurable reflective surface information indicating at least one of:

first reconfigurable reflective surface information regarding the first reconfigurable reflective surface, or second reconfigurable reflective surface information regarding the second reconfigurable reflective surface.

18. The base station of claim 17, wherein the transmitting the signal in the first sub-band comprises:

beam-forming the signal in a first direction; and wherein the one or more processors, to transmit the signal in the second sub-band, are configured to:

beam-forming the signal in a second direction that is different from the first direction.

19. The base station of claim 17, wherein the one or more processors, to receive the reconfigurable reflective surface information, are configured to:

receive the reconfigurable reflective surface information via uplink control information, or receive the reconfigurable reflective surface information via multiplexed uplink control information.

20. The base station of claim 17, wherein the one or more processors, to receive the reconfigurable reflective surface information, are configured to:

receive, the reconfigurable reflective surface information multiplexed with at least one of a hybrid automatic repeat request (HARQ) acknowledgement or channel state information (CSI) report.

21. The base station of claim 17, wherein the one or more processors, to receive the reconfigurable reflective surface information, are configured to:

receive at least a portion of the reconfigurable reflective surface information via physical uplink control channel (PUCCH) communication, receive at least a portion of the reconfigurable reflective surface information multiplexed with PUCCH communication, receive at least a portion of the reconfigurable reflective surface information via physical uplink shared channel (PUSCH) communication, or receive at least a portion of the reconfigurable reflective surface information multiplexed with PUSCH communication.

22. The base station of claim 17, wherein the one or more processors, to receive the reconfigurable reflective surface information, are configured to:

Receive data identifying at least one of the first reconfigurable reflective surface or the second reconfigurable reflective surface.

23. The base station of claim 17, wherein the configuration information indicates a maximum number of reconfigurable reflective surfaces for which the UE is to transmit respective reconfigurable reflective surface information.

24. The base station of claim 17, wherein the configuration information indicates a mapping between sub-band indices and the set of reconfigurable reflective surfaces.

25. The base station of claim 17, wherein the one or more processors, to receive the reconfigurable reflective surface information, are configured to:

receive the reconfigurable reflective surface information in a sequence of multiple k-bit segments, wherein each k-bit segment, of the multiple k-bit segments, corresponds to a reconfigurable reflective surface of the set of reconfigurable reflective surfaces.

26. The base station of claim 17, wherein the configuration information includes information identifying a measure of priority associated with the reconfigurable reflective surface information; and the measure of priority indicates reconfigurable reflective surface information priority relative to at least one of hybrid automatic repeat request (HARQ) priority or channel state information (CSI) priority.

27. A method of wireless communication performed by a user equipment (UE), comprising:

receiving configuration information identifying a set of sub-bands for receiving, via a set of reconfigurable reflective surfaces, a signal;

receiving, via a first reconfigurable reflective surface of the set of reconfigurable reflective surfaces, the signal in a first sub-band of the set of sub-bands;

receiving, via a second reconfigurable reflective surface of the set of reconfigurable reflective surfaces, the signal in a second sub-band of the set of sub-bands; and transmitting, based at least in part on receiving the signal, reconfigurable reflective surface information indicating at least one of:

first reconfigurable reflective surface information regarding the first reconfigurable reflective surface, or second reconfigurable reflective surface information regarding the second reconfigurable reflective surface.

28. The method of claim 27, wherein transmitting the reconfigurable reflective surface information comprises:

transmitting the reconfigurable reflective surface information via uplink control information, or multiplexing the reconfigurable reflective surface information with uplink control information.

29. A method of wireless communication performed by a base station, comprising:

transmitting, to a user equipment (UE), configuration information identifying a set of sub-bands for transmitting, via a set of reconfigurable reflective surfaces, a signal;

transmitting, to a first reconfigurable reflective surface of the set of reconfigurable reflective surfaces, the signal in a first sub-band of the set of sub-bands;

transmitting, to a second reconfigurable reflective surface of the set of reconfigurable reflective surfaces, the signal in a second sub-band of the set of sub-bands; and receiving, from the UE, reconfigurable reflective surface information indicating at least one of:

first reconfigurable reflective surface information regarding the first reconfigurable reflective surface, or second reconfigurable reflective surface information regarding the second reconfigurable reflective surface.

30. The method of claim 29, wherein the transmitting the signal in the first sub-band comprises:

beam-forming the signal in a first direction; and wherein transmitting the signal in the second sub-band comprises:

beam-forming the signal in a second direction that is different from the first direction.

* * * * *